United States Patent
Ma et al.

(10) Patent No.: US 12,483,447 B2
(45) Date of Patent: Nov. 25, 2025

(54) PHASE NOISE ESTIMATION METHOD, APPARATUS, AND SYSTEM

(71) Applicant: Huawei Technologies Co., Ltd., Shenzhen (CN)

(72) Inventors: Qianli Ma, Chengdu (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 269 days.

(21) Appl. No.: 18/344,031

(22) Filed: Jun. 29, 2023

(65) Prior Publication Data

US 2023/0344682 A1 Oct. 26, 2023

Related U.S. Application Data

(63) Continuation of application No. PCT/CN2021/140637, filed on Dec. 22, 2021.

(30) Foreign Application Priority Data

Dec. 30, 2020 (CN) .......................... 202011631423.5

(51) Int. Cl.
*H04L 5/04* (2006.01)
*H04L 25/03* (2006.01)

(52) U.S. Cl.
CPC .............................. *H04L 25/03006* (2013.01)

(58) Field of Classification Search
None
See application file for complete search history.

(56) References Cited

U.S. PATENT DOCUMENTS

| | | | |
|---|---|---|---|
| 2021/0044372 A1* | 2/2021 | Yang | H04L 27/2613 |
| 2021/0351889 A1* | 11/2021 | Landis | H04L 27/261 |
| 2021/0376978 A1* | 12/2021 | Paz | H04L 5/0048 |
| 2022/0021497 A1* | 1/2022 | Bai | H04L 5/0048 |
| 2022/0109537 A1* | 4/2022 | Zewail | H04L 5/0094 |
| 2023/0299905 A1* | 9/2023 | Yuan | H04W 72/1268 370/329 |

* cited by examiner

Primary Examiner — Duc T Duong
(74) Attorney, Agent, or Firm — Slater Matsil, LLP

(57) ABSTRACT

In accordance with an embodiment, a phase noise estimation method includes: obtaining, by a receive end, first information indicating a first parameter corresponding to interference information of a first phase tracking reference signal (PTRS), wherein the first parameter comprises one or more of a first phase set or a first amplitude set; obtaining, by the receive end, a first signal, wherein the first signal is determined based on the first parameter and the interference information of the first PTRS, wherein an amplitude of the first signal meets a first threshold; and determining, by the receive end based on the first information and the first signal, an estimated value of a phase noise corresponding to the first PTRS.

20 Claims, 11 Drawing Sheets

Sine signal of f=400 MHZ (a)

(b)

PHASE NOISE ESTIMATION METHOD, APPARATUS, AND SYSTEM

CROSS-REFERENCE TO RELATED APPLICATIONS

This application is a continuation of International Application No. PCT/CN2021/140637, filed on Dec. 22, 2021, which claims priority to Chinese Patent Application No. 202011631423.5, filed on Dec. 30, 2020. The disclosures of the aforementioned applications are hereby incorporated by reference in their entireties.

TECHNICAL FIELD

This application relates to the field of communication technologies, and in particular, to a phase noise estimation method, an apparatus, and a system.

BACKGROUND

In an existing communication system, when a transmit end transmits a signal to a receive end, a phase of the signal varies randomly under action of various noises, that is, the phase noise introduces a phase error, and consequently communication performance of the communication system deteriorates or the communication system even fails to work normally.

Based on this, the transmit end may track the phase noise by using a phase tracking reference signal (PTRS), and perform precoding processing on the PTRS in a non-linear precoding manner, so that the receive end estimates, based on the received signal, the phase noise corresponding to the PTRS. Therefore, the phase error introduced by the phase noise is compensated, and the communication performance of the communication system is improved.

For example, when performing precoding processing on the PTRS in the non-linear precoding manner, the transmit end may perform interference pre-cancellation on the PTRS by using an interference cancellation matrix, and at the same time, reduce, by using a modulo operation, a signal power that is increased by using the interference cancellation matrix.

However, because a modulo operation in non-linear precoding is non-linear, when the transmit end performs precoding processing on the PTRS, a phase and an amplitude of the PTRS are damaged. As a result, the receive end cannot properly estimate, based on the received signal, the phase noise corresponding to the PTRS, and therefore cannot properly perform phase compensation, affecting the communication performance of the communication system.

SUMMARY

In view of this, this application provides a phase noise estimation method, an apparatus, and a system, and can resolve an existing technical problem that a receive end cannot properly estimate a phase noise corresponding to a PTRS due to a non-linear modulo operation introduced when a transmit end performs precoding processing on the PTRS.

According to a first aspect, an embodiment of this application provides a phase noise estimation method, and the method includes: The receive end obtains first information and a first signal, and determines, based on the first information and the first signal, an estimated value of a phase noise corresponding to a first PTRS. The first information indicates a first parameter corresponding to interference information of the first PTRS. The first parameter includes one or more of the following: a first phase set, and a first amplitude set. The first signal is determined based on the first parameter and the interference information of the first PTRS. An amplitude of the first signal meets a first threshold.

Based on the first aspect, the receive end may determine, based on the first information, the first parameter introduced when a transmit end performs a non-linear operation on the first PTRS, properly determine, based on the first parameter and the received first signal, the estimated value of the phase noise corresponding to the first PTRS, and then perform phase compensation based on the estimated value of the phase noise. This improves communication performance of a communication system.

In a possible design, the first information includes an index of the first parameter; or the first information includes an index of the first parameter.

Based on this possible design, the receive end may directly determine the first parameter based on the first information, or may directly determine the index of the first parameter based on the first information, and determine the first parameter based on the index. This provides a feasible solution for the receive end to determine the first parameter based on the first information.

In a possible design, the first information further indicates a second parameter. The second parameter includes one or more of the following: a non-linear interference threshold, a phase noise level, and an amplitude/power adjustment threshold.

Based on this possible design, the first information may further include one or more in the foregoing second parameter, and the receive end may further properly determine, based on the second parameter, the estimated value of the phase noise corresponding to the first PTRS, to improve the communication performance of the communication system.

In a possible design, the first information includes the second parameter; or the first information includes an index of the second parameter.

Based on this possible design, the receive end may directly determine the second parameter based on the first information, or may directly determine the index of the second parameter based on the first information, and determine the second parameter based on the index. This provides a feasible solution for the receive end to determine the second parameter based on the first information.

In a possible design, before the receive end obtains the first information, the receive end further transmits second information that indicates a phase noise capability of the receive end.

In a possible design, the phase noise capability of the receive end includes one or more of the following: a phase noise level of the receive end, a maximum distortion degree corresponding to non-linear precoding of the receive end, and a maximum value of a PTRS phase offset degree processed by the receive end.

Based on the foregoing two possible designs, before obtaining the first information, the receive end may transmit the phase noise capability of the receive end to the transmit end, so that the transmit end can properly determine the first parameter based on the phase noise capability of the receive end, to improve rationality and accuracy of the first parameter, thereby improving the communication performance of the communication system.

In a possible design, after obtaining the first information, the receive end further transmits third information that indicates whether the first information is adapted to the phase noise capability of the receive end.

Based on this possible design, after obtaining the first information, the receive end may further determine, based on the first information, whether the first information is adapted to the phase noise capability of the receive end. If the first information is not adapted to the phase noise capability of the receive end, the receive end may notify the transmit end that the first information is not adapted to the phase noise capability of the receive end. Therefore, the transmit end properly determines, based on the information, first information that is adapted to the phase noise capability of the receive end, to improve rationality and accuracy of the first information, thereby improving the communication performance of the communication system.

According to a second aspect, an embodiment of this application provides a receive end. The receive end may implement a function performed by the receive end in the first aspect or the possible design of the first aspect. The function may be implemented by executing corresponding software by hardware. The hardware or software includes one or more modules corresponding to the foregoing functions, such as a transceiver unit and a processing unit. The transceiver unit is configured to obtain first information and a first signal. The processing unit is configured to determine, based on the first information and the first signal, an estimated value of a phase noise corresponding to the first PTRS. The first information indicates a first parameter corresponding to interference information of the first PTRS. The first parameter includes one or more of the following: a first phase set, and a first amplitude set. The first signal is determined based on the first parameter and the interference information of the first PTRS. An amplitude of the first signal meets a first threshold.

For a specific implementation of the receive end, refer to a behavior function of the receive end in the phase noise estimation method provided in the first aspect or any possible design of the first aspect. Based on the receive end in the second aspect, the processing unit may determine, based on the first information obtained by the transceiver unit, the first parameter introduced when a transmit end performs a non-linear operation on the first PTRS, properly determine, based on the first parameter and based on the first signal received by the transceiver unit, the estimated value of the phase noise corresponding to the first PTRS, and then perform phase compensation based on the estimated value of the phase noise. This improves communication performance of a communication system.

In a possible design, the first information includes an index of the first parameter; or the first information includes an index of the first parameter.

Based on this possible design, the processing unit may directly determine the first parameter based on the first information, or may directly determine the index of the first parameter based on the first information, and determine the first parameter based on the index. This provides a feasible solution for the processing unit to determine the first parameter based on the first information.

In a possible design, the first information further indicates a second parameter. The second parameter includes one or more of the following: a non-linear interference threshold, a phase noise level, and an amplitude/power adjustment threshold.

Based on this possible design, the first information may further include one or more in the foregoing second parameter, and the processing unit may further properly determine, based on the second parameter, the estimated value of the phase noise corresponding to the first PTRS, to improve the communication performance of the communication system.

In a possible design, the first information includes the second parameter; or the first information includes an index of the second parameter.

Based on this possible design, the processing unit may directly determine the second parameter based on the first information, or may directly determine the index of the second parameter based on the first information, and determine the second parameter based on the index. This provides a feasible solution for the processing unit to determine the second parameter based on the first information.

In a possible design, before obtaining the first information, the transceiver unit further transmits second information that indicates a phase noise capability of the receive end.

In a possible design, the phase noise capability of the receive end includes one or more of the following: a phase noise level of the receive end, a maximum distortion degree corresponding to non-linear precoding of the receive end, and a maximum value of a PTRS phase offset degree processed by the receive end.

Based on the foregoing two possible designs, before obtaining the first information, the transceiver unit may transmit the phase noise capability of the receive end to the transmit end, so that the transmit end can properly determine the first parameter based on the phase noise capability of the receive end, to improve rationality and accuracy of the first parameter, thereby improving the communication performance of the communication system.

In a possible design, after obtaining the first information, the transceiver unit further transmits third information that indicates whether the first information is adapted to the phase noise capability of the receive end.

Based on this possible design, after the transceiver unit obtains the first information, the processing unit may further determine, based on the first information, whether the first information is adapted to the phase noise capability of the receive end. If the first information is not adapted to the phase noise capability of the receive end, the transceiver unit may notify the transmit end that the first information is not adapted to the phase noise capability of the receive end. Therefore, the transmit end properly determines, based on the information, first information that is adapted to the phase noise capability of the receive end, to improve rationality and accuracy of the first information, thereby improving the communication performance of the communication system.

According to a third aspect, an embodiment of this application provides a receive end. The receive end may be a receive end, or a chip or a system on chip in the receive end. The receive end may implement functions performed by the receive end in the foregoing aspects or each possible design, and the functions may be implemented by hardware. In a possible design, the receive end may include: a transceiver and a processor. The transceiver and the processor may be configured to support the receive end in implementing the functions in the first aspect or any possible design of the first aspect. For example, the transceiver is configured to obtain first information and a first signal. The processor is configured to determine, based on the first information and the first signal, an estimated value of a phase noise corresponding to the first PTRS. The first information indicates a first parameter corresponding to interference information of the first PTRS. The first parameter includes one or more of the following: a first phase set, and a first amplitude set. The first signal is determined based on the first parameter and the interference information of the first PTRS. An amplitude of the first signal meets a first threshold. In still another possible design, the receive end may further include a memory. The memory is configured to store computer executable instructions and data that are necessary for the receive end. When the receive end runs, the transceiver and the processor execute the computer execution instructions stored in the memory, so that the receive end performs the channel noise estimation method according to the first aspect or any possible design of the first aspect.

For a specific implementation of the receive end in the third aspect, refer to a behavior function of the receive end in the channel noise estimation method provided in the first aspect or any possible design of the first aspect.

According to a fourth aspect, an embodiment of this application provides a phase noise estimation method, and the method includes: A transmit end transmits first information that indicates a first parameter corresponding to interference information of a first PTRS. The first parameter includes one or more of the following: a first phase set, and a first amplitude set. The transmit end further performs non-linear precoding on the first PTRS based on the first parameter and the interference information of the first PTRS, to obtain a first signal, and transmits the first signal. An amplitude of the first signal meets a first threshold.

Based on the fourth aspect, the transmit end transmits the first information and the first signal to a receive end, so that the receive end can determine, based on the first information, the first parameter introduced when the transmit end performs a non-linear operation on the first PTRS, properly determine, based on the first parameter and the received first signal, an estimated value of a phase noise corresponding to the first PTRS, and then perform phase compensation based on the estimated value of the phase noise. This improves communication performance of a communication system.

In a possible design, the first information includes an index of the first parameter; or the first information includes an index of the first parameter.

Based on this possible design, the transmit end may directly indicate the first parameter by using the first information, or may indicate the index of the first parameter by using the first information, and indicate the first parameter based on the index. This provides a feasible solution for the receive end to determine the first parameter based on the first information.

In a possible design, the first information further indicates a second parameter. The second parameter includes one or more of the following: a non-linear interference threshold, a phase noise level, and an amplitude/power adjustment threshold.

Based on this possible design, the first information may further include one or more in the foregoing second parameter, so that the receive end may further properly determine, based on the second parameter, the estimated value of the phase noise corresponding to the first PTRS, to improve the communication performance of the communication system.

In a possible design, the first information includes the second parameter; or the first information includes an index of the second parameter.

Based on this possible design, the transmit end may directly indicate the second parameter by using the first information, or may indicate the index of the second parameter by using the first information, and indicate the second parameter based on the index. This provides a feasible solution for the receive end to determine the second parameter based on the first information.

In a possible design, before transmitting the first signal, the transmit end further obtains second information that indicates a phase noise capability of the receive end. The transmit end determines the first information based on the phase noise capability of the receive end.

In a possible design, the phase noise capability of the receive end includes one or more of the following: a phase noise level of the receive end, a maximum distortion degree corresponding to non-linear precoding of the receive end, and a maximum value of a PTRS phase offset degree processed by the receive end.

Based on the foregoing two possible designs, before determining the first information, the transmit end may properly determine the first parameter based on the phase noise capability of the receive end, to improve rationality and accuracy of the first parameter, thereby improving the communication performance of the communication system.

In a possible design, after transmitting the first information, the transmit end further obtains third information that indicates whether the first information is adapted to the phase noise capability of the receive end.

Based on this possible design, the transmit end may properly determine, based on the third information, first information that is adapted to the phase noise capability of the receive end, to improve rationality and accuracy of the first information, thereby improving the communication performance of the communication system.

According to a fifth aspect, an embodiment of this application provides a transmit end. The transmit end may implement a function performed by the transmit end in the fourth aspect or the possible design of the fourth aspect. The function may be implemented by executing corresponding software by hardware. The hardware or software includes one or more modules corresponding to the foregoing functions, such as a transceiver unit and a processing unit. The transceiver unit is configured to transmit first information that indicates a first parameter corresponding to interference information of a first PTRS. The first parameter includes one or more of the following: a first phase set, and a first amplitude set. The processing unit is configured to perform non-linear precoding on the first PTRS based on the first parameter and the interference information of the first PTRS, to obtain a first signal, and the transceiver unit is further configured to transmit the first signal. An amplitude of the first signal meets a first threshold.

For a specific implementation of the transmit end, refer to a behavior function of the transmit end in the phase noise estimation method provided in the fourth aspect or any possible design of the fourth aspect. Based on the transmit end in the fifth aspect, the transceiver unit transmits the first information and the first signal to the receive end, so that the receive end may determine, based on the first information, the first parameter introduced when the transmit end performs a non-linear operation on the first PTRS, properly determine, based on the first parameter and the received first signal, an estimated value of a phase noise corresponding to the first PTRS, and then perform phase compensation based on the estimated value of the phase noise. This improves communication performance of a communication system.

In a possible design, the first information includes an index of the first parameter; or the first information includes an index of the first parameter.

Based on this possible design, the transceiver unit may directly indicate the first parameter by using the first information, or may indicate the index of the first parameter by using the first information, and indicate the first parameter based on the index. This provides a feasible solution for the receive end to determine the first parameter based on the first information.

In a possible design, the first information further indicates a second parameter. The second parameter includes one or more of the following: a non-linear interference threshold, a phase noise level, and an amplitude/power adjustment threshold.

Based on this possible design, the first information may further include one or more in the foregoing second parameter, so that the receive end may further properly determine, based on the second parameter, the estimated value of the phase noise corresponding to the first PTRS, to improve the communication performance of the communication system.

In a possible design, the first information includes the second parameter; or the first information includes an index of the second parameter.

Based on this possible design, the transceiver unit may directly indicate the second parameter by using the first information, or may indicate the index of the second parameter by using the first information, and indicate the second parameter based on the index. This provides a feasible solution for the receive end to determine the second parameter based on the first information.

In a possible design, before transmitting the first signal, the transceiver unit further obtains second information that indicates a phase noise capability of the receive end. The transmit end determines the first information based on the phase noise capability of the receive end.

In a possible design, the phase noise capability of the receive end includes one or more of the following: a phase noise level of the receive end, a maximum distortion degree corresponding to non-linear precoding of the receive end, and a maximum value of a PTRS phase offset degree processed by the receive end.

Based on the foregoing two possible designs, before the transceiver unit transmits the first information, the processing unit may properly determine the first parameter based on the phase noise capability of the receive end, to improve rationality and accuracy of the first parameter, thereby improving the communication performance of the communication system.

In a possible design, after transmitting the first information, the transceiver unit further obtains third information that indicates whether the first information is adapted to the phase noise capability of the receive end.

Based on this possible design, the processing unit may properly determine, based on the third information, first information that is adapted to the phase noise capability of the receive end, to improve rationality and accuracy of the first information, thereby improving the communication performance of the communication system.

According to a sixth aspect, an embodiment of this application provides a transmit end. The transmit end may be a transmit end, or a chip or a system on chip in the transmit end. The transmit end may implement functions performed by the transmit end in the foregoing aspects or each possible design, and the functions may be implemented by hardware. In a possible design, the transmit end may include: a transceiver and a processor. The transceiver and the processor may be configured to support the transmit end in implementing the functions in the fourth aspect or any possible design of the fourth aspect. For example, the transceiver is configured to transmit first information that indicates a first parameter corresponding to interference information of a first PTRS. The first parameter includes one or more of the following: a first phase set, and a first amplitude set. The processor is configured to perform non-linear precoding on the first PTRS based on the first parameter and the interference information of the first PTRS, to obtain a first signal, and the transceiver is further configured to transmit the first signal. An amplitude of the first signal meets a first threshold. In still another possible design, the transmit end may further include a memory. The memory is configured to store computer executable instructions and data that are necessary for the transmit end. When the transmit end runs, the transceiver and the processor execute the computer execution instructions stored in the memory, so that the transmit end performs the channel noise estimation method according to the fourth aspect or any possible design of the fourth aspect.

For a specific implementation of the transmit end in the sixth aspect, refer to a behavior function of the transmit end in the channel noise estimation method provided in the fourth aspect or any possible design of the fourth aspect.

According to a seventh aspect, a communication apparatus is provided, where the communication apparatus includes one or more processors. The one or more processors are configured to run a computer program or instructions, and when the one or more processors execute the computer instruction or the instructions, the communication apparatus performs the channel noise estimation method according to the first aspect or any possible design of the first aspect; and or perform the channel noise estimation method according to the fourth aspect or any possible design of the fourth aspect.

In a possible design, the communication apparatus further includes one or more memories, the one or more memories are coupled to the one or more processors, and the one or more memories are configured to store the foregoing computer program or instructions. In a possible implementation, the memory is located outside the communication apparatus. In another possible implementation, the memory is located inside the communication apparatus. In this embodiment of this application, the processor and the memory may alternatively be integrated into one component. In other words, the processor and the memory may alternatively be integrated together. In a possible implementation, the communication apparatus further includes a transceiver. The transceiver is configured to receive information and/or transmit information.

In a possible design, the communication apparatus further includes one or more communication interfaces, the one or more communication interfaces are coupled to the one or more processors, and the one or more communication interfaces are configured to communicate with another module other than the communication apparatus.

According to an eighth aspect, a communication apparatus is provided, where the communication apparatus includes an input/output interface and a logic circuit. The input/output interface is configured to obtain input information and/or output information. The logic circuit is configured to perform the phase noise estimation method according to the first aspect or any possible design of the first aspect, or perform the phase noise estimation method according to the fourth aspect or any possible design of the fourth aspect, and perform processing based on the input information and/or generate the output information. The input information and/or the output information includes first information and a first signal. The first information indicates a first parameter corresponding to interference information of a first phase tracking reference signal PTRS. The first parameter includes one or more of the following: a first phase set, and a first amplitude set. The first signal is determined based on the first parameter and the interference information of the first PTRS. An amplitude of the first signal meets a first threshold.

According to a ninth aspect, a computer-readable storage medium is provided, where the computer-readable storage medium stores computer instructions or a program, and when the computer instructions or the program are/is run on a computer, the computer performs the phase noise estimation method according to the first aspect or any possible design of the first aspect, or performs the phase noise estimation method according to the fourth aspect or any possible design of the fourth aspect.

According to a tenth aspect, a computer program product including computer instructions is provided. When the computer program product runs on a computer, the computer performs the phase noise estimation method according to the first aspect or any possible design of the first aspect, or performs the phase noise estimation method according to the fourth aspect or any possible design of the fourth aspect.

According to an eleventh aspect, an embodiment of this application provides a computer program. When the computer program is run on a computer, the computer performs the phase noise estimation method according to the first aspect or any possible design of the first aspect, or performs the phase noise estimation method according to the fourth aspect or any possible design of the fourth aspect.

For technical effects brought by any design manner of the seventh aspect to the eleventh aspect, refer to technical effects brought by any possible design of the first aspect, or refer to technical effects brought by any possible design of the fourth aspect. Details are not described again.

According to a twelfth aspect, a communication system is provided. The communication system includes the receive end according to any one of the second aspect and the third aspect, and the transmit end according to any one of the fifth aspect and the sixth aspect.

DETAILED DESCRIPTION OF ILLUSTRATIVE EMBODIMENTS

Before embodiments of this application are described, technical terms in embodiments of this application are described.

Time-domain signal: A signal whose amplitude varies with time. For example, a sound signal.

Figure 1A:
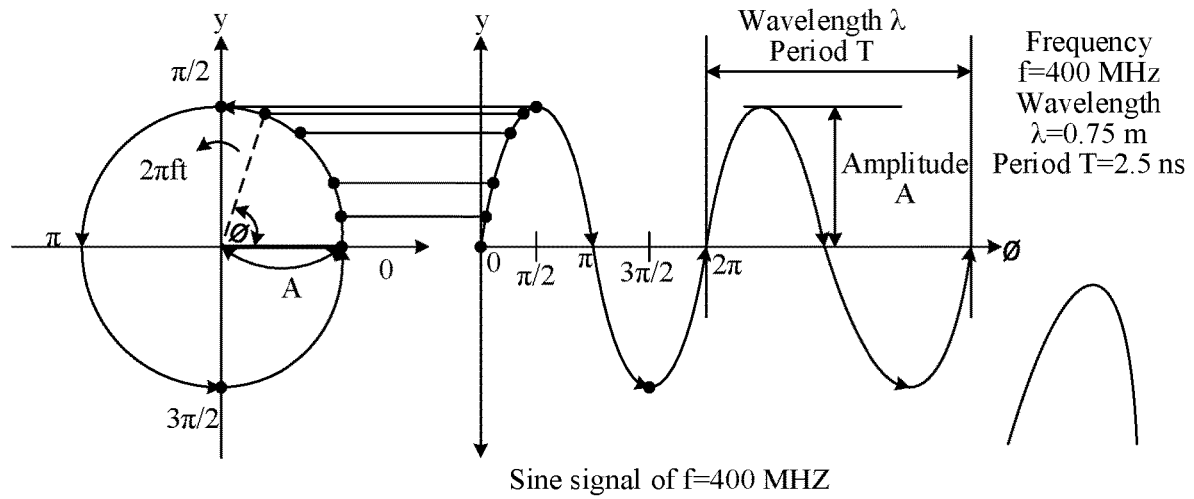
FIG. 1a is a schematic diagram of a time domain signal according to an embodiment of this application.

For example, as shown in FIG. 1a, a signal formed by a standard sine wave may be referred to as a time domain signal, or may be described as a sine signal. In a period T, a location of a sine signal may be understood as a phase, generally represented by an angle, and may be intuitively understood as an angle φ of a sinusoidal signal on the right of the figure mapped to a unit circle on the left of the figure. In addition, the period T of the sine signal is fixed, and since the frequency f=1/T, a frequency of the sine signal is constant. For example, an amplitude peak of the sine signal may be A, a wavelength λ=0.75 m, a period T=2.5 ns, and a frequency f=400 MHz.

Fourier transform: A signal can be switched between a time domain and a frequency domain.

The Fourier transform may quickly change a time-domain signal into a frequency-domain signal, or change a frequency-domain signal into a time-domain signal. After the time domain signal is converted into the frequency domain signal, the frequency domain signal may be understood as an impact signal, that is, the frequency domain signal is a line segment, and a line length of the line segment indicates an amplitude of the signal.

Figure 1B:
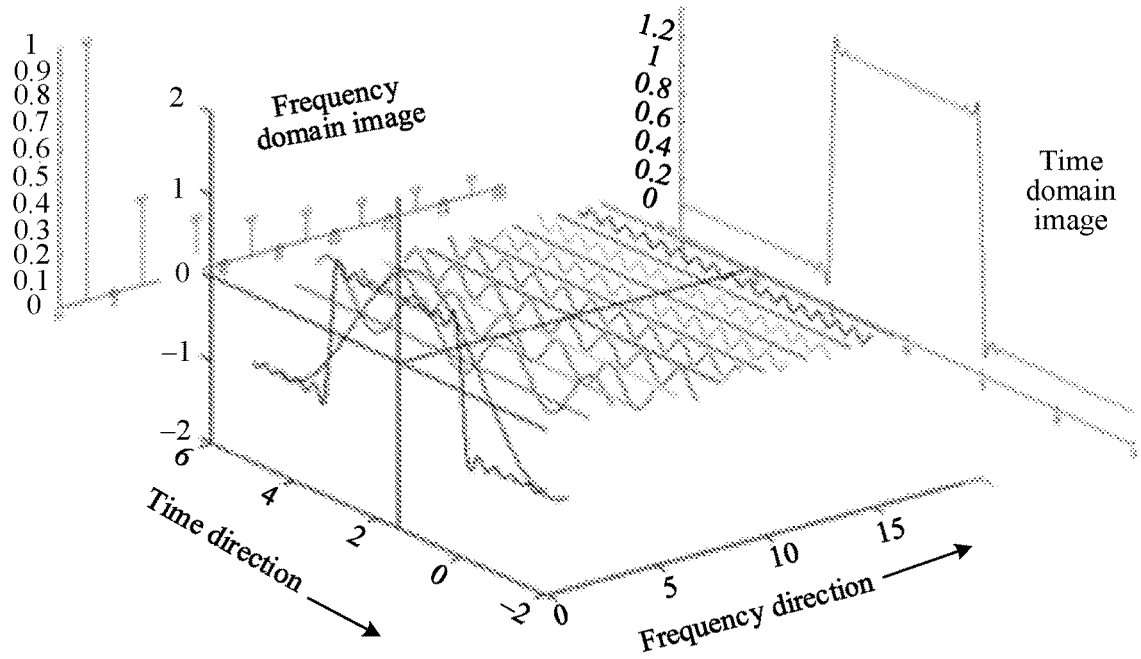
FIG. 1b is a schematic diagram of a radio signal in a time domain and a frequency domain according to an embodiment of this application.

For example, a radio signal in a long term evolution (LTE) system or a fifth generation new radio (5G NR) system is used as an example. As shown in FIG. 1b, a radio signal transmitted over an air interface (free space) can be regarded as superposition of a plurality of sine signals in a time domain, which is similar to a square wave. In a frequency domain, the radio signal may be understood as a plurality of impact signals with different amplitudes. The radio signal may also be described as a signal, and is not limited.

Based on FIG. 1a and FIG. 1b, it can be learned that after a signal is converted from a time domain to a frequency domain, the signal becomes simpler. A time domain signal may be converted into a frequency domain signal based on this property, and signal processing is performed based on the frequency domain signal, so that processing complexity of a communication system can be reduced.

Modulation: In a communication system, information that needs to be transmitted is usually represented by "0" and "1" bits. Because a signal is usually an analog signal with a frequency, an amplitude, and a phase, information bits may be carried on the signal through modulation.

Figure 1C:
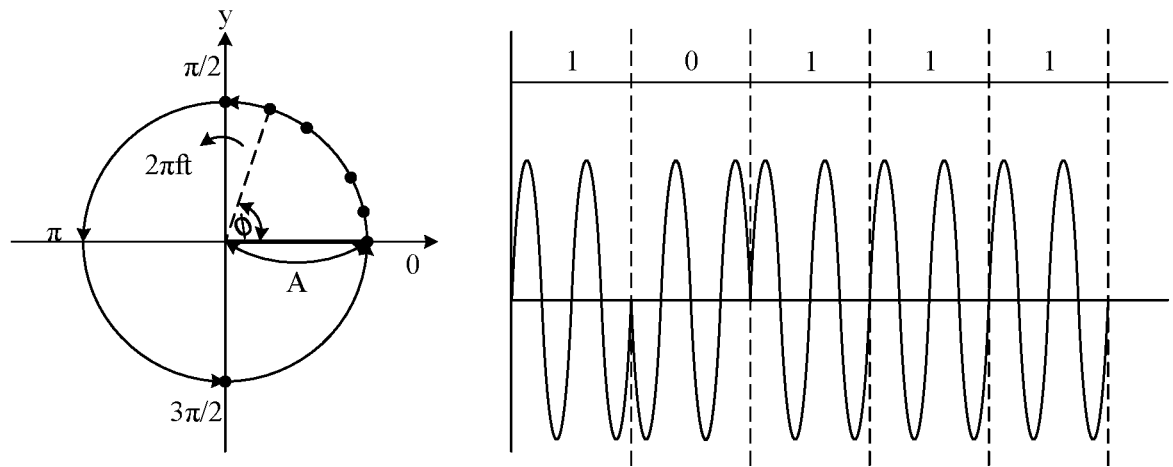
FIG. 1c is a schematic diagram of BPSK modulation according to an embodiment of this application.

For example, binary phase-shift keying (BPSK) is used as an example. As shown in FIG. 1c, it is assumed that a sine wave start phase corresponding to an information bit 1 is 0, and a sine wave start phase corresponding to an information bit 0 is $\pi$. According to a unit circle shown on the left of the figure, information bits 10111 may be a sine wave shown on the right of the figure.

It should be noted that, after normalization processing, a BPSK amplitude may be constant to 1. The BPSK amplitude may also change, so that more abundant modulation constellation diagrams such as quadrature phase shift keying (QPSK), 16 quadrature amplitude modulation (16-QAM), 64QAM, 256QAM, and 1024QAM can be obtained. This is not limited.

Figure 1D:
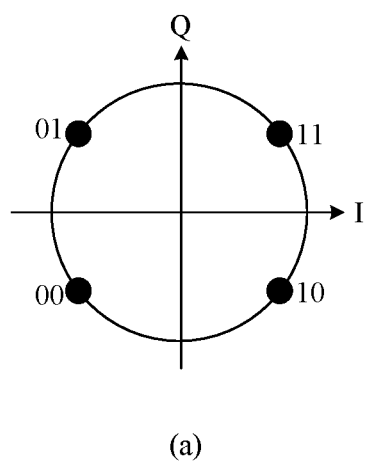
FIG. 1d is a modulation constellation diagram according to an embodiment of this application.
Figure 1D:
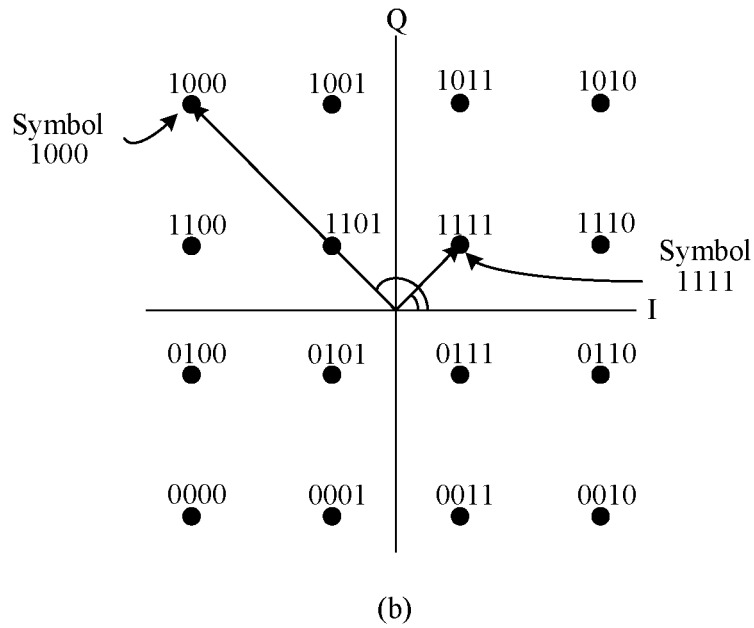

For example, QPSK is used as an example. As shown in (a) in FIG. 1d, one point (or may also be described as one symbol) in the figure may correspond to two information bits, that is, there are $2^2=4$ symbols in QPSK. Each symbol has an amplitude and a phase of the symbol. It should be noted that, in QPSK, amplitudes of symbols are constant, and a phase difference between symbols is $\pi/2$.

For example, 16QAM is used as an example. As shown in (b) in FIG. 1d, one point (or may also be described as one symbol) in the figure may correspond to four information bits, that is, 16QAM has $2^4=16$ symbols. Each symbol has an amplitude and a phase of the symbol. It should be noted that, there may be a plurality of amplitudes in 16QAM, and each symbol has a different phase.

For example, 1024QAM is used as an example. Each symbol may correspond to ten information bits, that is, 1024QAM has $2^{10}=1024$ symbols. Each symbol has an amplitude and a phase of the symbol.

Single-carrier waveform modulation: Serially arranged transmit signals are convoluted by using a roll-off filter, to form a transmit signal.

For example, that single-carrier waveform modulation is single carrier-QAM modulation (single carrier-QAM, SC-QAM) is used as an example. As shown in (a) in FIG. 1e, an SC-QAM transmit end may sequentially perform signal processing such as a modulo operation, up-sampling, and pulse shaping on a signal transmitted by an encoder, to obtain a radio frequency (RF) signal.

Multi-carrier waveform modulation: Transmit signals are arranged in parallel, to form a transmit signal in an inverse fast Fourier transformation (IFFT) manner.

For example, that multi-carrier waveform modulation is orthogonal frequency division multiplexing (OFDM) is used as an example. As shown in (b) in FIG. 1e, an OFDM transmit end may sequentially perform signal processing such as subcarrier mapping, IFFT, and cyclic prefix addition on a signal, to obtain an RF.

Different from the foregoing single-carrier waveform modulation and multi-carrier waveform modulation, there is another modulation manner for implementing a single-carrier waveform by using multi-carriers, that is, discrete fourier transform spread orthogonal frequency division multiplexing (DFT-S-OFDM).

A waveform modulated through DFT-S-OFDM is almost equivalent to a conventional single-carrier waveform, is adopted by protocols such as the third generation partnership project (3GPP) because the waveform modulated through DFT-S-OFDM uses a multi-carrier implementation and is easily compatible with OFDM, but essence of the waveform modulated through DFT-S-OFDM is still single-carrier.

Figure 1E:
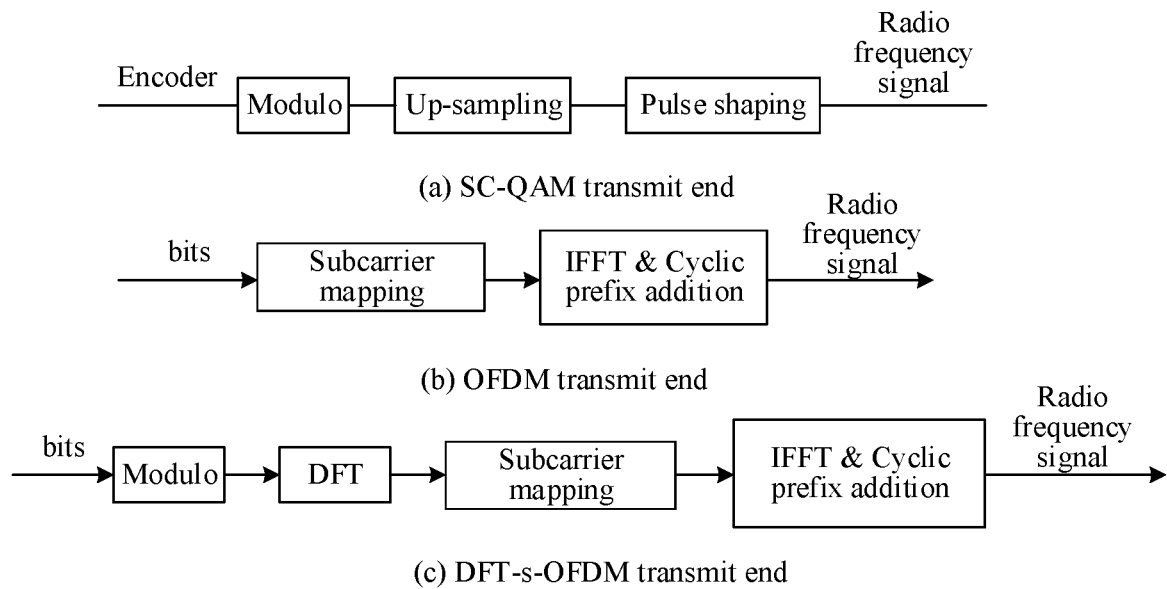
FIG. 1e is a diagram of modulation models of transmit ends according to an embodiment of this application.
Figure 1F:
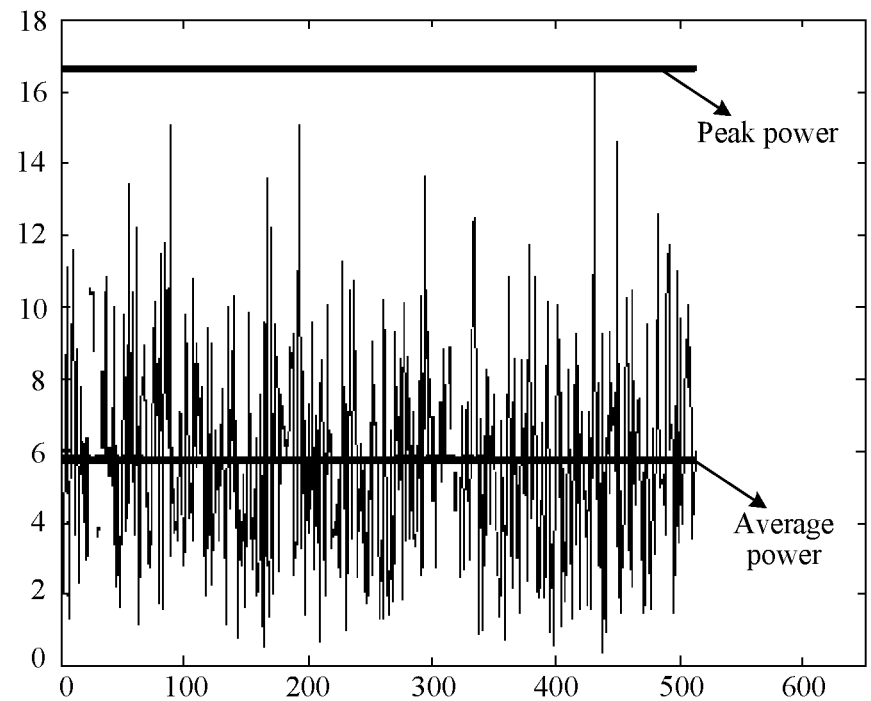
FIG. 1f is a schematic diagram of an amplitude change of a discrete signal according to an embodiment of this application.

For example, as shown in (c) in FIG. 1e, a DFT-S-OFDM transmit end may sequentially perform signal processing such as a modulo operation, discrete Fourier transform (DFT), subcarrier mapping, IFFT, and cyclic prefix addition on a signal, to obtain an RF.

In an existing communication system, a transmit end may perform communication by using a single-antenna/multi-antenna single-carrier communication system, or may perform communication by using a multi-carrier communication system. Compared with the multi-carrier communication system, the single-carrier communication system has a lower peak-to-average power ratio (PAPR) and lower sender complexity, and is more applicable to a high-frequency and large-bandwidth communication system.

It should be noted that, the single-carrier communication system may refer to a communication system using single-carrier waveform modulation, or may refer to a communication system using DFT-S-OFDM. This is not limited.

PAPR: A signal is observed in a time domain as a sine wave with a changing amplitude, and the amplitude is not constant. A signal amplitude peak in one period may be different from an amplitude peak in another period. Therefore, an average power and a peak power in each period may be different. In a long period of time, a peak power is a maximum transient power that occurs at a certain probability. Generally, the probability is 0.01% ($10^{-4}$). A ratio of the peak power to average power of a signal at this probability is the peak-to-average power ratio.

Factors that affect the PAPR may include one or more of the following: a peak-to-average power ratio of a baseband signal and a peak-to-average power ratio brought by multi-carrier power superposition.

For example, for a baseband signal modulated through 1024QAM, a peak-to-average power ratio of the baseband signal is high. For a baseband signal whose signal energy is 1 and that is modulated through QPSK, BPSK, or the like, a schematic diagram of an amplitude change of a discrete signal shown in FIG. if may be obtained by superposing a plurality of baseband signals. It should be noted that, QPSK and BPSK mean that a signal amplitude is constant and only a phase is changed.

For example, that a multi-carrier waveform modulation mode is OFDM is used as an example. In OFDM, a signal on a carrier may be represented as a sinc function, and the signal has a smear on left and right sides. At a certain probability, smears of a plurality of carriers may be superimposed at a distance to form a point with a large peak power.

It should be noted that, when a signal of a communication system is sent to a distance, power amplification needs to be performed. Due to technical and cost limitations, one power amplifier usually performs linear amplification in only one range. If the range is exceeded, signal distortion is caused. Signal distortion causes a receive end to fail to correctly parse the signal. To ensure that a peak of the signal is still within a linear range of the power amplifier, an average power of the signal needs to be reduced. However, reducing the average power of the signal causes efficiency of the power amplifier to be reduced, or may be described as a coverage area of the power amplifier to be reduced. Therefore, to meet a coverage requirement, a signal generation technology with a low PAPR needs to be selected.

Among communication systems, a high-frequency communication system has abundant frequency band resources, has advantages such as large bandwidth, a high integrated antenna array, and a high throughput, and can meet an increasing communication requirement. However, the high-frequency communication system also has a serious problem of intermediate radio frequency distortion, such as a phase noise (PHN) and a center frequency offset (CFO). In addition, a Doppler frequency shift of the high-frequency communication system is also large, and a phase error is introduced with the phase noise, the carrier frequency offset, and the Doppler frequency shift introduced, resulting in performance deterioration or even failure of the high-frequency communication system.

For example, the phase noise is used as an example. As a frequency band increases, a higher power spectral density of the phase noise indicates a greater impact on a received signal. When a frequency band is high, deterioration of the phase noise causes poor demodulation performance.

Figure 1G:
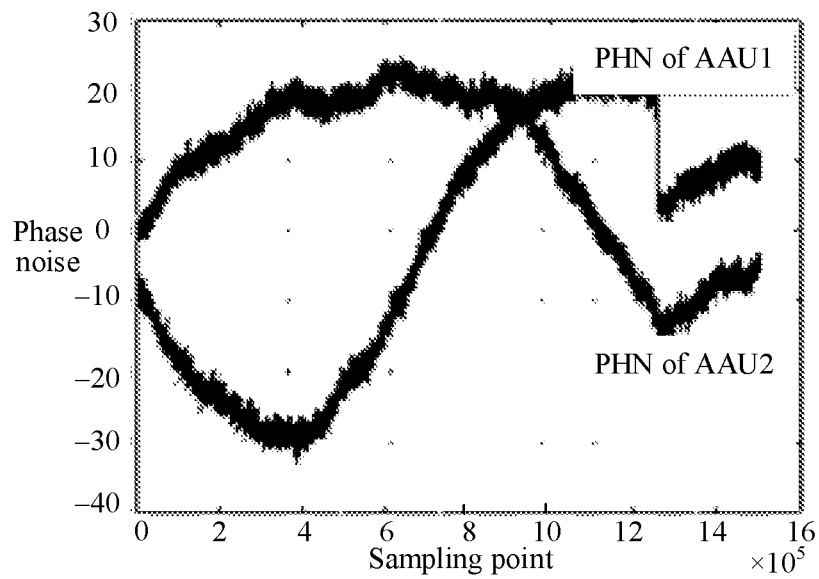
FIG. 1g is a schematic diagram of a phase noise according to an embodiment of this application.

For example, as shown in FIG. 1g, an example in which a random phase of an active antenna unit 1 (AAU1) and an AAU2 in a 60 GHz communication system changes within [−30 20] degrees is used. Impact of a phase noise may be: $y(n)=x(n)e^{j\Theta_n}$, where y(n) represents a signal affected by the phase noise; x(n) indicates the signal before being affected by the phase noise; n indicates a sampling point; n=0, 1, . . . , N−1; and both the AAU1 and the AAU2 may generate a random phase value at each sampling point n.

To resolve impact of a phase noise on demodulation performance, a phase tracking reference signal (PTRS) is introduced for both two waveforms (OFDM and DFT-s-OFDM) in the NR protocol, and the phase noise is estimated based on the PTRS. In this way, a phase error introduced by the phase noise is compensated, and communication performance of a communication system is improved.

Figure 1H:
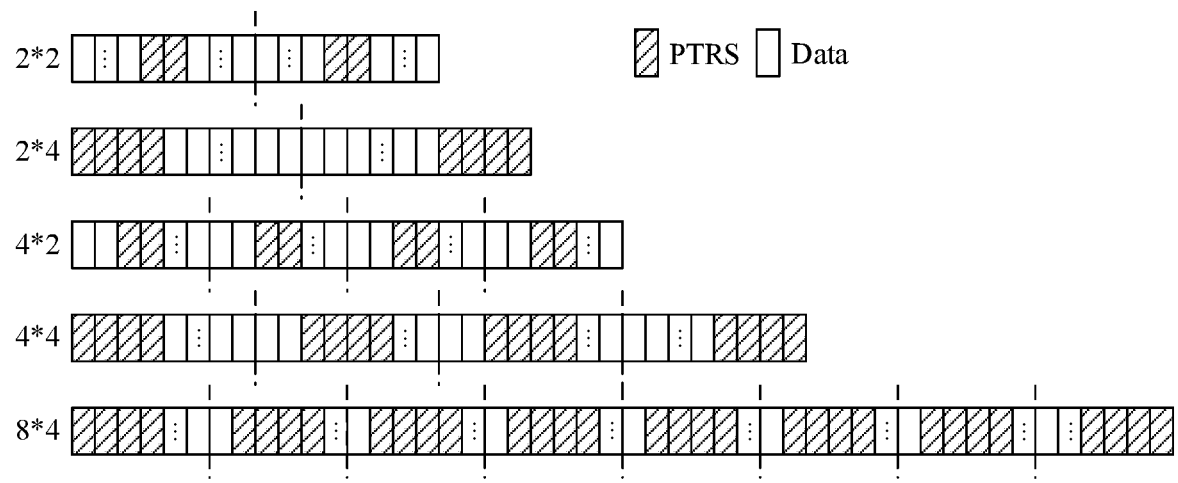
FIG. 1h is a schematic diagram of a PTRS according to an embodiment of this application.

For example, a PTRS in DFT-s-OFDM is used as an example. Refer to FIG. 1h. Each grid in the figure indicates a sampling point, namely, a QAM symbol or a π/2 BPSK symbol or a QPSK symbol. Parameters in FIG. 1h may include a number N of PTRS groups and a number M of samples in the group, that is, a total quantity of PTRSs is N*M. A specific mapping location is related to the two parameters and a scheduled bandwidth.

For example, when the number M of samples in the group is 2, the scheduled bandwidth may be evenly divided into N segments or N intervals, and one PTRS group is mapped to the middle of each segment (interval), as shown in a first row and a third row in FIG. 1h. When the number M of samples in the group is 4, the scheduled bandwidth may be evenly divided into N segments or N intervals, and one PTRS group is mapped to each segment (interval). A PTRS group of a first segment (interval) is mapped to a header of the first segment. A PTRS group of an $N^{th}$ segment is mapped to a tail of the $N^{th}$ segment (interval), and a PTRS group of another segment (interval) is mapped to a middle, as shown in a second row of FIG. 1h (in this case, there are only two segments (intervals)). Therefore, there is no PTRS group mapped in the middle of a segment (interval) as shown in a fourth row, and a fifth row.

It should be noted that, the foregoing parameters N and M are implicitly determined by a current scheduled bandwidth based on a preconfigured mapping relationship (for example, a correspondence between a scheduled bandwidth and a parameter shown in Table 1, where NRB0 to NRB4 are preconfigured values) in a transmission process. For a same terminal device and a same network device (with a same frequency and a same subcarrier spacing), scheduled bandwidths corresponding to five groups of parameters in FIG. 1h may show a monotonically increasing trend.

TABLE 1

| Scheduled bandwidth (scheduled bandwidth) | Number N of PTRS groups (number of PTRS groups) | Number M of samples per PTRS group (number of samples per PTRS group) |
| --- | --- | --- |
| $N_{RB0} \leq N_{RB} < N_{RB1}$ | 2 | 2 |
| $N_{RB1} \leq N_{RB} < N_{RB2}$ | 2 | 4 |
| $N_{RB2} \leq N_{RB} < N_{RB3}$ | 4 | 2 |
| $N_{RB3} \leq N_{RB} < N_{RB4}$ | 4 | 4 |
| $N_{RB4} \leq N_{RB}$ | 8 | 4 |

Figure 1I:
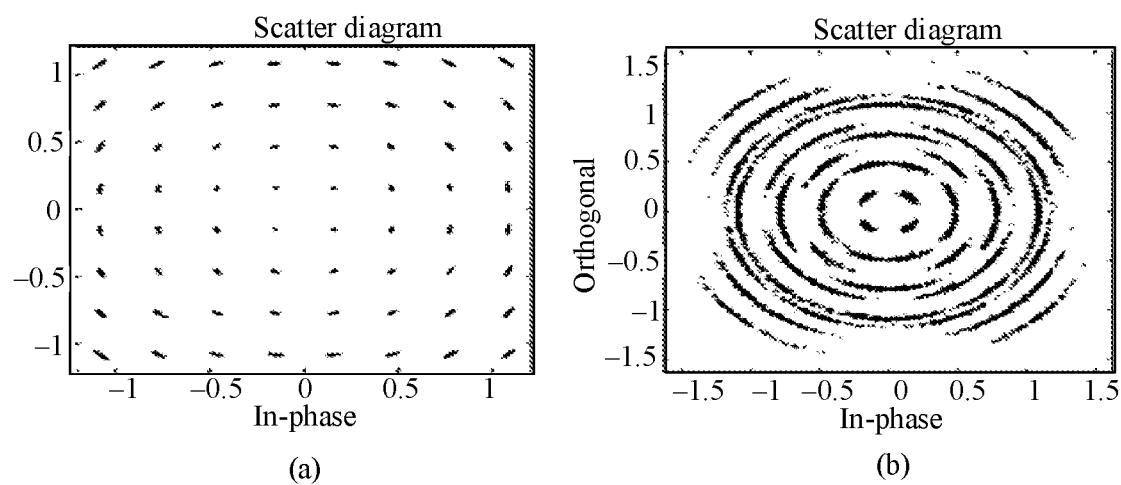
FIG. 1i is a schematic diagram of impact of a phase noise on a received signal according to an embodiment of this application.

For example, as shown in FIG. 1i, (b) in FIG. 1i is a received signal affected by phase noise. In time domain, the phase noise is represented as a phase shift performed on a standard constellation point in a scatter diagram. A receive end may estimate, based on the received signal, a phase noise corresponding to a PTRS, to compensate for a phase error introduced by the phase noise, to obtain a phase-compensated received signal shown in (a) in FIG. 1i, thereby improving communication performance of a communication system.

In wireless transmission, interference often exists (for example, multipath interference introduced by a channel, interference introduced by another terminal device, or interference inherent in a communication system, for example, multiple input multiple output (MIMO)), and faster than nyquist (FTN) modulation). Because interference has a great impact on the performance of the communication system, the transmit end may cancel the interference by using a precoding scheme.

Performance and complexity of different precoding schemes are different from each other. Typical precoding schemes may be classified into two types: linear precoding and non-linear precoding. Each type of precoding scheme has a communication scenario to which the precoding scheme adapts. For example, in a 3GPP protocol, a used precoding scheme is a linear precoding scheme with low complexity. In some communication scenarios, for example, when interference is strong, a gain provided by a linear precoding scheme is too small to meet a transmission requirement of a communication system, and a non-linear precoding scheme may be used.

Figure 1J:
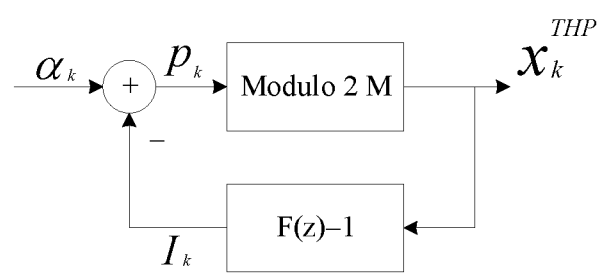
FIG. 1j is a schematic diagram of a non-linear precoding model according to an embodiment of this application.

For example, before transmitting a signal, the transmit end may perform interference pre-cancellation on an interference term $I_k$ of an input signal $a_k$ by using an interference cancellation matrix by using a non-linear precoding model shown in FIG. 1j, to obtain $p_k$. In addition, a modulo operation is performed to reduce a signal power that is increased by the interference cancellation matrix, to obtain the following output signal $x_k^{THP}$:

$$x_k^{THP} = p_k - 2M \left\lfloor \frac{p_k}{2M} + \frac{1}{2} \right\rfloor,$$

where

M is a signal interval of a modulo operation, and an amplitude of a signal $p_k$ obtained after interference pre-cancellation may be limited to [−M, M] by performing a modulo operation, thereby avoiding excessive signal fluctuation caused by non-linear precoding.

It should be noted that, in FIG. 1j, F(z) indicates an interference coefficient of a known signal, −1 indicates subtraction of an interference coefficient of the signal, and F(z)−1 indicates interference values of all preamble signals to this signal.

Currently, non-linear precoding is not introduced into a 5G communication standard. For a single carrier, for example, a design of a PTRS of DFT-s-OFDM is limited to ensuring performance of linear precoding. In a future protocol release, for example, 5G-18 or 6G, if non-linear precoding is introduced, a corresponding PTRS design is lacking.

If non-linear precoding is introduced in 5G and a future protocol release, the transmit end may perform non-linear precoding processing on the PTRS with reference to the foregoing non-linear precoding model shown in FIG. 1j, to obtain the following output signal $z_k^{THP}$.

$$z_k^{THP} = \rho_0 \lambda_0 \sqrt{\tau} e^{j\psi_k} v_k + n_k = \rho_0 \lambda_0 \sqrt{\tau} e^{j\psi_k}(a_k + 2Md_k) + n_k,$$

where $\rho_0 \lambda_0$ is an amplitude coefficient; $e^{j\psi_k}$ is phase noise;

$$d_k = -\left\lfloor \frac{p_k}{2M} + \frac{1}{2} \right\rfloor$$

is nonlinearity brought by the modulo operation; and $n_k$ is a Gaussian white noise.

When the receive end receives the foregoing output signal, the receive end may estimate a phase noise at a PTRS based on the output signal. An estimated value of the phase noise corresponding to the PTRS may be represented as follows $\hat{\psi}_{kF}^{THP}$:

$$\hat{\psi}_{kF}^{THP} = \angle(\tilde{z}_{kF}^{THP}/(\alpha_{kF} + 2Md_{kF})), \text{ where}$$

F indicates a pilot signal.

It should be noted that, the output signal may also be described as a received signal of the receive end. This is not limited.

However, because a modulo operation in non-linear precoding is non-linear, when the transmit end performs non-linear precoding processing on the PTRS, a phase and an amplitude of the PTRS are damaged. The receive end cannot know a specific value of $d_k$. As a result, the receive end cannot properly estimate, based on the received signal, the phase noise corresponding to the PTRS, and therefore cannot properly perform phase compensation, affecting the communication performance of the communication system.

To resolve an existing technical problem that a receive end cannot properly estimate a phase noise corresponding to a PTRS due to a non-linear modulo operation introduced when a transmit end performs precoding processing on the PTRS. An embodiment of this application provides a phase noise estimation method. A receive end obtains first information and a first signal, and determines, based on the first information and the first signal, an estimated value of a phase noise corresponding to a first PTRS. The first information indicates a first parameter corresponding to interference information of the first PTRS. The first parameter includes one or more of the following: a first phase set, and a first amplitude set. The first signal is determined based on the first parameter and the interference information of the first PTRS. An amplitude of the first signal meets a first threshold. In this embodiment of this application, the receive end may determine, based on the first information, the first parameter introduced when a transmit end performs a non-linear operation on the first PTRS, properly determine, based on the first parameter and the received first signal, the estimated value of the phase noise corresponding to the first PTRS, and then perform phase compensation based on the estimated value of the phase noise. This improves communication performance of a communication system.

The following describes implementations of embodiments of this application in detail with reference to accompanying drawings in this specification.

The communication method provided in this embodiment of this application may be used in any communication system. The communication system may be a third generation partnership project (3GPP) communication system, for example, a long term evolution (LTE) system, or may be a fifth generation (5G) mobile communication system, a new radio (NR) system, or a new vehicle to everything (NR V2X) system. The communication method may also be applied to an LTE and 5G hybrid networking system, or a device-to-device (D2D) communication system, a machine-to-machine (M2M) communication system, an Internet of Things (IoT), an unmanned aerial vehicle communication system, and another next-generation communication system, and may alternatively be a non-3GPP communication system. This is not limited.

Figure 2:
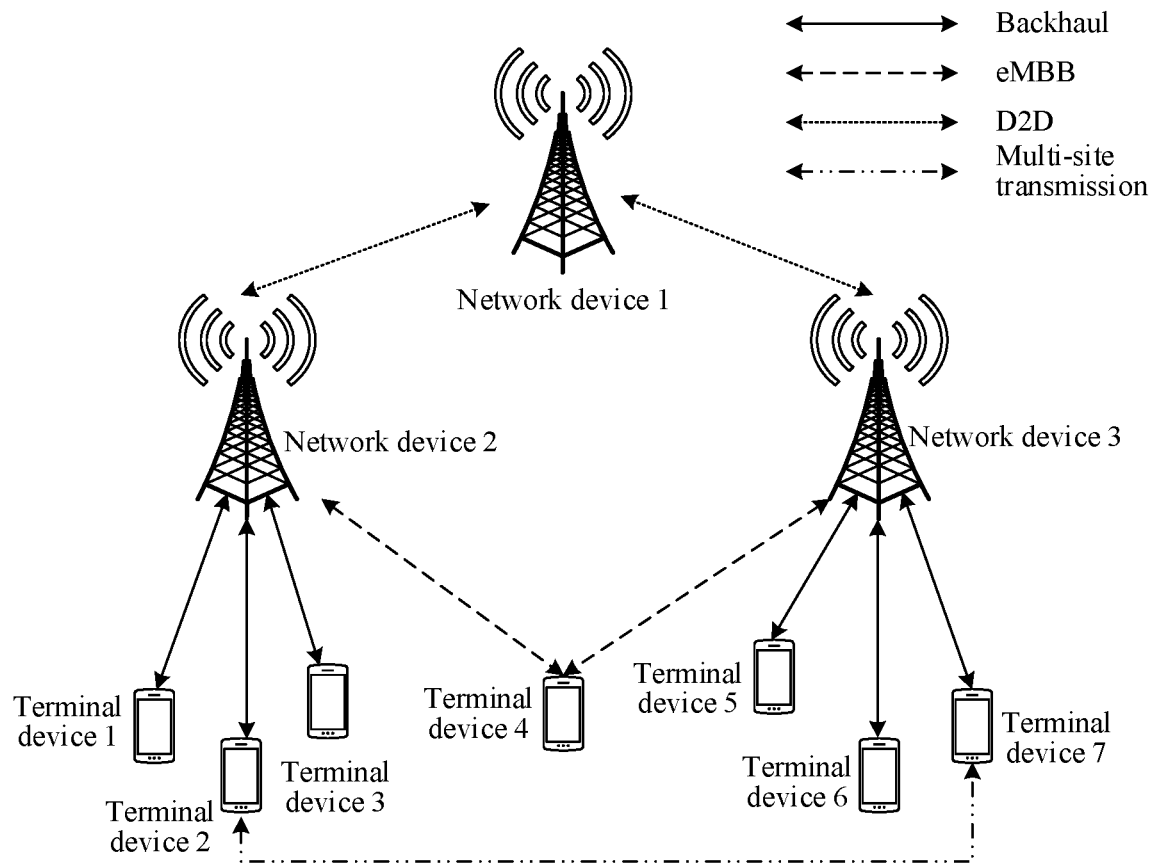
FIG. 2 is a schematic diagram of a communication system according to an embodiment of this application.

For example, as shown in FIG. 2, the communication method provided in this embodiment of this application may be applied to various communication scenarios, for example, may be applied to one or more of the following communication scenarios: scenarios where multi-layer DFT-s-OFDM may be applied, such as multi-site transmission (that is, a same terminal device transmits signals to a plurality of transmission points at the same time), backhaul, wireless to the x (WTTx), enhanced mobile broadband (eMBB), and device to device (D2D). Embodiments of this application may be further applied to another scenario in which multi-layer DFT-s-OFDM may be applied. This is not limited.

The following uses FIG. 2 as an example to describe the communication method provided in embodiments of this application.

FIG. 2 is a schematic diagram of a communication system according to an embodiment of this application. As shown in FIG. 2, the communication system may include a plurality of network devices and a plurality of terminal devices.

The network device may be an apparatus deployed in a radio access network to provide a wireless communication function for the terminal device. The network device may include various forms of macro base stations, micro base stations (also referred to as small cells), relay stations, access points, and the like. In a system that uses different radio access technologies, a name of a network device may vary, for example, global system for mobile communication (GSM) or code division multiple access (CDMA), a base transceiver station (BTS) in a network, a NB (NodeB) in wideband code division multiple access (WCDMA), and an eNB or eNodeB (evolved NodeB) in long term evolution (LTE). Alternatively, the network device may be a radio controller in a cloud radio access network (CRAN) scenario. Alternatively, the network device may be a base station device in a future 5G network or a network device in a future evolved PLMN network. Alternatively, the network device may be a wearable device or an in-vehicle device. Alternatively, the network device may be a transmission and reception point (TRP), or the like. This is not limited.

The terminal device may include various handheld devices, in-vehicle devices, wearable devices, computing devices, or other processing devices connected to a wireless modem that have a wireless communication function. The terminal device may be an unmanned aerial vehicle, a mobile station (MS), a subscriber unit, a cellular phone, a smart phone, a wireless data card, a personal digital assistant (PDA for short) computer, a tablet computer, a wireless modem (modem), a handheld device (handset), a laptop computer, a machine type communication (MTC) terminal device, and the like. This is not limited.

Figure 3:
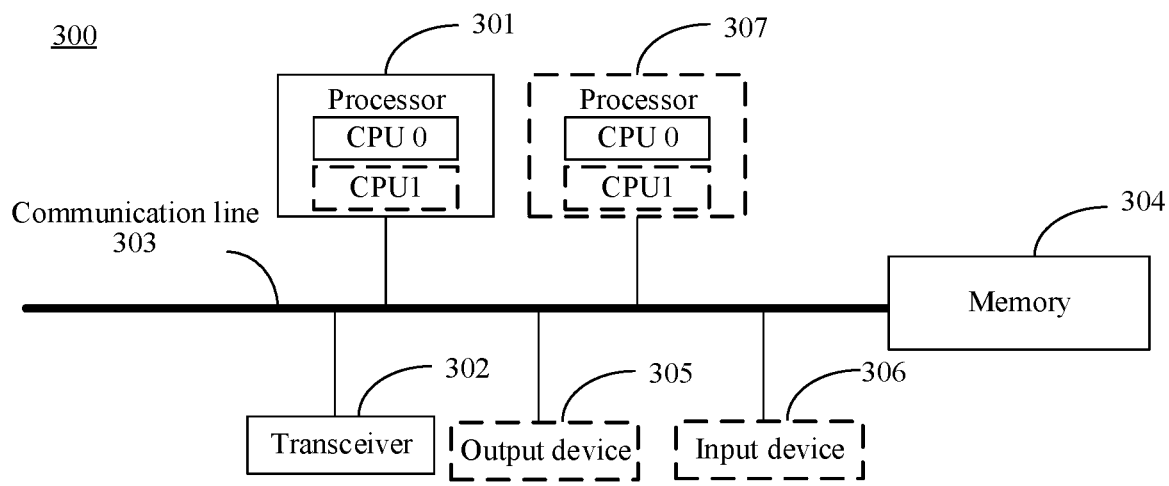
FIG. 3 is a schematic diagram of composition of a communication apparatus according to an embodiment of this application.

During specific implementation, as shown in FIG. 2, for example: each terminal device and each network device may use a composition structure shown in FIG. 3, or include components shown in FIG. 3. FIG. 3 is a schematic composition diagram of a communication apparatus 300 according to an embodiment of this application. The communication apparatus 300 may be a terminal device, or a chip or a system on chip in the terminal device, or may be a network device, or a chip or a system on chip in the network device. As shown in FIG. 3, the communication apparatus 300 includes a processor 301, a transceiver 302, and a communication line 303.

Further, the communication apparatus 300 may further include a memory 304. The processor 301, the memory 304, and the transceiver 302 may be connected through the communication line 303.

The processor 301 is a central processing unit (CPU), a general-purpose processor, a network processor (NP), a digital signal processor (DSP), a microprocessor, a microcontroller, a programmable logic device (PLD), or any combination thereof. Alternatively, the processor 301 may be another apparatus having a processing function, for example, a circuit, a component, or a software module. This is not limited.

The transceiver 302 is configured to communicate with another device or another communication network. The another communication network may be an Ethernet, a radio access network (RAN), a wireless local area network (WLAN), or the like. The transceiver 302 may be a module, a circuit, a transceiver, or any apparatus that can implement communication.

The communication line 303 is configured to transmit information between components included in the communication apparatus 300.

The memory 304 is configured to store instructions. The instructions may be a computer program.

The memory 304 may be a read-only memory (ROM) or another type of static storage device that can store static information and/or instructions, or may be a random access memory (RAM) or another type of dynamic storage device that can store information and/or instructions, or may be an electrically erasable programmable read-only memory (EEPROM), a compact disc read-only memory (CD-ROM) or another compact disc storage, optical disc storage (including a compressed optical disc, a laser disc, an optical disc, a digital universal optical disc, a Blu-ray optical disc, and the like), magnetic disk storage medium or another magnetic storage device, or the like. This is not limited.

It should be noted that the memory 304 may exist independently of the processor 301, or may be integrated with the processor 301. The memory 304 may be configured to store instructions, program code, some data, or the like. The memory 304 may be located inside the communication apparatus 300, or may be located outside the communication apparatus 300. This is not limited. The processor 301 is configured to execute the instructions stored in the memory 304, to implement a phase noise estimation method provided in the following embodiment of this application.

In an example, the processor 301 may include one or more CPUs, for example, a CPU 0 and a CPU 1 in FIG. 3.

In an optional implementation, the communication apparatus 300 includes a plurality of processors. For example, in addition to the processor 301 in FIG. 3, the communication apparatus 300 may further include a processor 307.

In an optional implementation, the communication apparatus 300 further includes an output device 305 and an input device 306. For example, the input device 306 is a device such as a keyboard, a mouse, a microphone, or a joystick, and the output device 305 is a device such as a display or a speaker.

It should be noted that the communication apparatus 300 may be a desktop computer, a portable computer, a network server, a mobile phone, a tablet computer, a wireless terminal, an embedded device, a chip system, or a device having a similar structure in FIG. 3. In addition, the composition structure shown in FIG. 3 does not constitute a limitation on the communication apparatus. In addition to the components shown in FIG. 3, the communication apparatus may include more or fewer components than the components shown in the figure, or some components may be combined, or there may be a different component arrangement.

In this embodiment of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Other names may alternatively be used during specific implementation. This is not limited.

Figure 4:
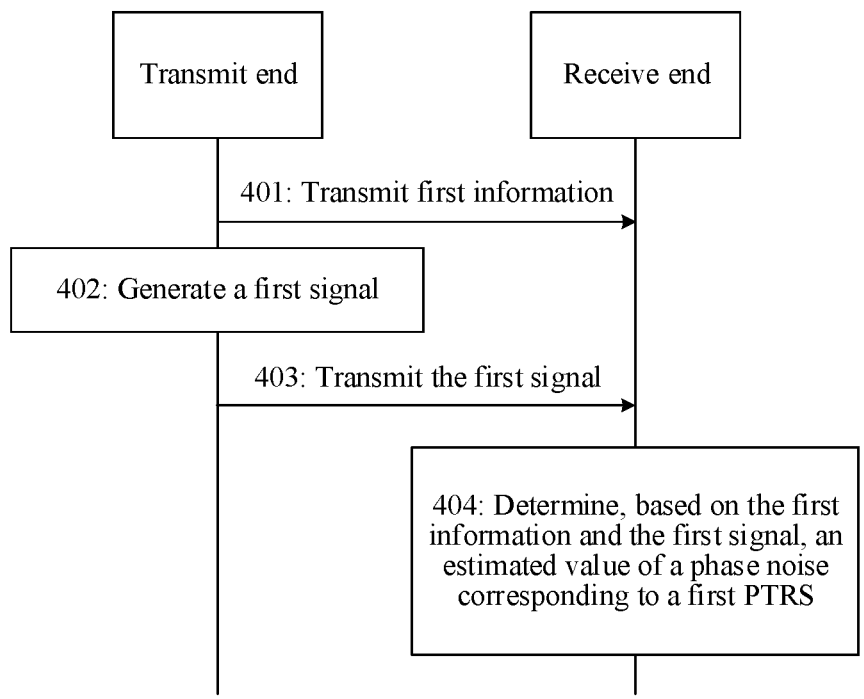
FIG. 4 is a flowchart of a phase noise estimation method according to an embodiment of this application.

With reference to the communication system shown in FIG. 2, the following describes a communication method provided in an embodiment of this application with reference to FIG. 4. A transmit end may be any network device in the communication system shown in FIG. 2, and a receive end may be any terminal device in the communication system shown in FIG. 2. Both the transmit end and the receive end described in the following embodiment may have the components shown in FIG. 3.

FIG. 4 is a flowchart of a phase noise estimation method according to an embodiment of this application. As shown in FIG. 4, the method may include the following steps.

Step 401: A transmit end transmits first information. Correspondingly, a receive end receives the first information.

The first information may be used to indicate a first parameter corresponding to interference information of a first PTRS. The first parameter includes one or more of the following: a first phase set, and a first amplitude set.

Specifically, the transmit end may obtain the interference information. The interference information may be single-antenna interference information, multi-antenna interference information, or may be single-antenna/multi-antenna hybrid interference information. The transmit end may determine the interference information of the first PTRS based on the interference information, and select, based on the interference information of the first PTRS from first parameters predefined in a communication protocol, the first parameter corresponding to the interference information of the first PTRS.

The transmit end may select, from the first parameters predefined in the communication protocol according to the following rule, the first parameter corresponding to the interference information of the first PTRS: The transmit end performs non-linear precoding processing on the first PTRS based on the first parameter corresponding to the interference information of the first PTRS to obtain a first signal. An amplitude of the first signal meets a first threshold.

In a possible design, when the first parameter includes the first phase set, the transmit end performs phase adjustment on the first PTRS by using a first phase in the first phase set, and performs non-linear precoding processing on the adjusted first PTRS, to obtain the first signal. The amplitude of the first signal meets the first threshold.

Figure 5:
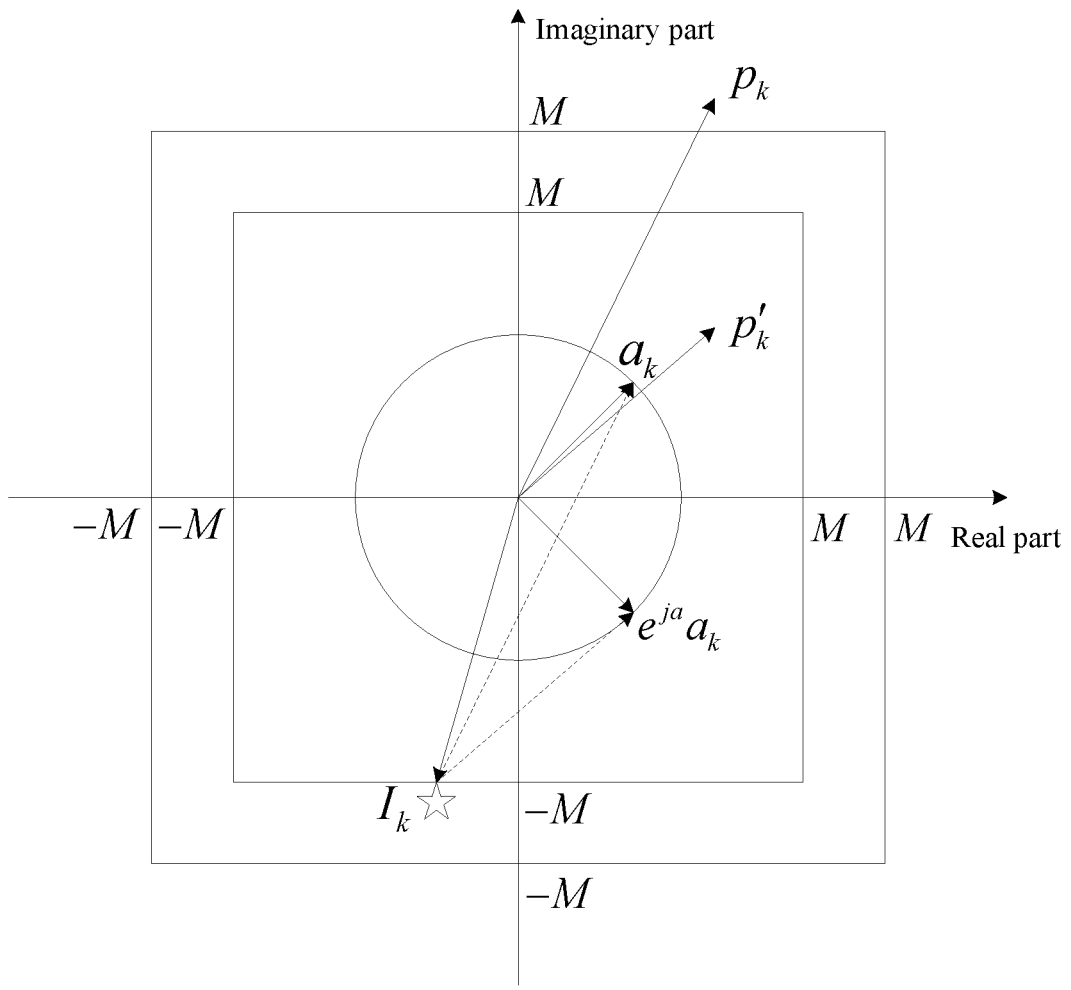
FIG. 5 is a schematic diagram of phase adjustment according to an embodiment of this application.

For example, as shown in FIG. 5, that the first PTRS is $a_k$, the interference information of the first PTRS is $I_k$, and the first threshold is [−M, M] are used as an example. It is assumed that a first PTRS obtained after phase adjustment is performed on the first PTRS by using a phase in the first phase set is $e^{ja}a_k$. It can be learned that an amplitude of a signal $p_k$ obtained after the transmit end performs non-linear precoding processing on the first PTRS before phase adjustment is greater than the first threshold; and an amplitude of a signal $\acute{p}_k$ obtained after the transmit end performs non-linear precoding processing on the first PTRS $e^{ja}a_k$ after phase adjustment is less than the first threshold.

That is, if the transmit end does not adjust the first PTRS by using the first phase set, the amplitude of the first signal may be greater than the first threshold, and the transmit end needs to perform a modulo non-linear operation. In this case, the first signal received by the receive end may be represented as: $z_k^{THP} = \rho_0 \lambda_0 \sqrt{\tau} e^{j\psi_k} v_k + n_k = \rho_0 \lambda_0 \sqrt{\tau} e^{j\psi_k}(a_k + 2Md_k) + n_k$. The estimated value of the phase noise corresponding to the first PTRS of the receive end may be represented as: $\hat{\psi}_k^{THP} = \angle(\tilde{z}_k^{THP}/(a_k + 2Md_k))$. Because the receive end cannot obtain a value of $d_k$, the receive end cannot properly estimate the phase noise.

It should be noted that, the first threshold may be the foregoing [−M, M], or may be (−M, M], or [−M, M). This is not limited.

Optionally, in the first threshold, $|M| = 2\sqrt{Q}/a_b$.

|M| is an absolute value of M in the first threshold. Q is a number of constellation points. For example, for QPSK, Q=4. For 16QAM, Q=16. $a_b$ is a normalization factor. For example, for QPSK, $a_b = \sqrt{2}$. For 16QAM, $a_b = \sqrt{10}$. For 64QAM, $a_b = \sqrt{42}$. For 256QAM, $a_b = \sqrt{170}$. For 1024QAM, $a_b = \sqrt{648}$.

In this embodiment of this application, the transmit end adjusts the first PTRS by using the first phase set, so that the amplitude of the first signal is less than the first threshold, and the transmit end does not need to perform a modulo non-linear operation, that is, $d_k = 0$. In this case, the first signal received by the receive end may be represented as: $z_k^{THP} = \rho_0 \lambda_0 \sqrt{\tau} e^{j\psi_k} e^{ja} v_k + n_k = \rho_0 \lambda_0 \sqrt{\tau} e^{j\psi_k}(e^{ja} a_k + 2Md_k) + n_k$, and $d_k = 0$. The estimated value of the phase noise corresponding to the first PTRS of the receive end may be represented as: $\hat{\psi}_k^{THP} = \angle(\tilde{z}_k^{THP}/e^{ja}a_k)$. The receive end may properly estimate, based on the received first signal, the phase noise corresponding to the first PTRS, to properly perform phase compensation, and improve communication performance of a communication system.

Further, after receiving the first signal, the receive end may estimate a phase offset value based on the received first signal: $\beta = \angle(z_k^{THP}/e^{ja}a_k) = e^{-j(a+\psi_k)}$.

The phase offset value is a sum of a phase $\psi_k$ of the phase noise and a first phase a used by the transmit end.

For example, that the receive end determines the first phase set used by the transmit end is used as an example, and it is assumed that $a \in \{0, \pi/2, \pi, 3\pi/2\}$. A phase change caused by the phase noise is limited. For example, $\psi_k \in \{0, \pi/4\}$, a fixed first phase a and a randomly changed phase $\psi_k \in \{0, \pi/4\}$ may be determined separately by using the foregoing phase offset value.

Further, if a dynamic range of the randomly changed phase is large, for example $\psi_k \in \{0, \pi/2\}$, the first phase can only be selected from $a \in \{0, \pi\}$. Otherwise, the fixed first phase a cannot be separated from the randomly changed phase $\psi_k$. In addition, $a \in \{0, \pi\}$ may not guarantee that the amplitude of the first signal obtained after the non-linear precoding processing is performed after first phase rotation is used is always less than the first amplitude.

Based on this, the first amplitude set may be added on a basis of the first phase set, that is, the transmit end performs phase adjustment on the first PTRS by using the first phase set and the first amplitude set, and performs non-linear precoding processing on the adjusted first PTRS, to obtain the first signal. The amplitude of the first signal meets the first threshold.

Figure 6:
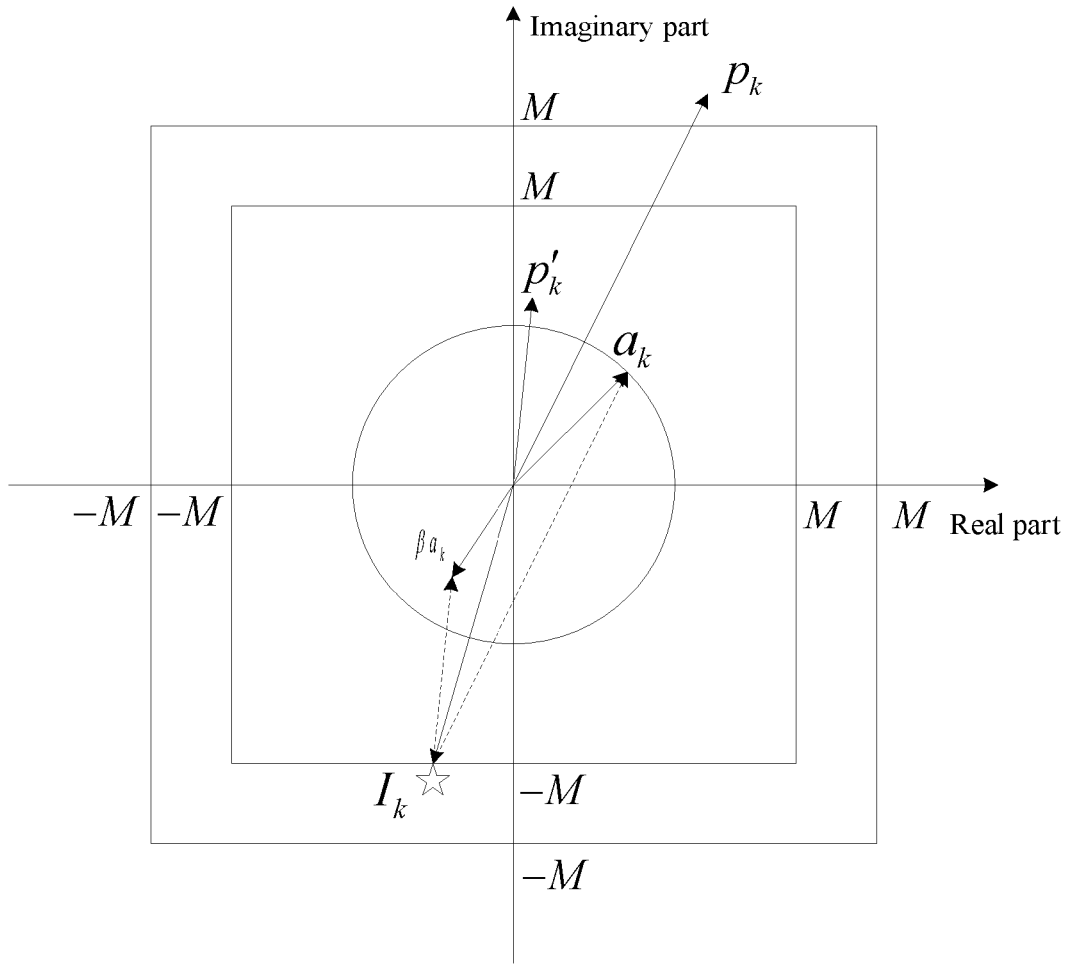
FIG. 6 is a schematic diagram of phase and amplitude adjustment according to an embodiment of this application.

For example, as shown in FIG. 6, that the first PTRS is $a_k$, the interference information of the first PTRS is $I_k$, and the first threshold is [−M, M] are used as an example. It is assumed that a first PTRS obtained after phase adjustment is performed on the first PTRS by using a first phase set and a first amplitude set is flak. It can be learned that an amplitude of a signal $p_k$ obtained after a transmit end performs non-linear precoding processing on the first PTRS $a_k$ before phase adjustment is greater than the first threshold; and an amplitude of a signal $\acute{p}_k$ obtained after the transmit end performs non-linear precoding processing on the first PTRS $\beta a_k$ flak after phase adjustment is less than the first threshold.

That is, if the transmit end does not adjust the first PTRS by using the first phase set and the first amplitude set, the amplitude of the first signal may be greater than the first threshold, and the transmit end needs to perform a modulo non-linear operation. In this case, the first signal received by the receive end may be represented as: $z_k^{THP} = \rho_0 A_0 \sqrt{\tau} e^{j\psi_k} v_k + n_k = \rho_0 \lambda_0 \sqrt{\tau} e^{j\psi_k}(a_k + 2Md_k) + n_k$. The estimated value of the phase noise corresponding to the first PTRS of the receive end may be represented as: $\hat{\psi}_k^{THP} = \angle(\tilde{z}_k^{THP}/(a_k + 2Md_k))$. Because the receive end cannot obtain a value of $d_k$, the receive end cannot properly estimate the phase noise.

In this embodiment of this application, by adjusting the first PTRS by using the first phase set and the first amplitude set, the transmit end can process greater interference and nonlinearity, so that the amplitude of the first signal is less than the first threshold, and the transmit end does not need to perform a modulo non-linear operation, that is, $d_k = 0$. In this case, the first signal received by the receive end may be represented as: $z_k^{THP} = \rho_0 \lambda_0 \sqrt{\tau} e^{j\psi_k} e^{ja} v_k + n_k = \rho_0 \lambda_0 \sqrt{\tau} e^{j\psi_k}(e^{ja} a_k + 2Md_k) + n_k$, and $d_k = 0$. The estimated value of the phase noise corresponding to the first PTRS of the receive end may be represented as: $\hat{\psi}_k^{THP} = \angle(\tilde{z}_k^{THP}/e^{ja}a_k)$. The receive end may properly estimate, based on the received first signal, the phase noise corresponding to the first PTRS, to properly perform phase compensation, and improve communication performance of a communication system.

Different from the foregoing processing of the first PTRS by the transmit end by using the first phase set or by using the first phase set and the first amplitude set, the transmit end may alternatively perform phase adjustment on the first PTRS by using the first amplitude set, and perform non-linear precoding processing on the adjusted first PTRS, to obtain the first signal, so that the amplitude of the first signal meets the first threshold, and the receive end can properly estimate the phase noise.

It should be noted that, when the first parameter includes the first phase set and the first amplitude set, when the receive end performs phase noise estimation, the receive end may only determine which first phase of the first phase set is used when the transmit end performs precoding processing, and does not need to determine which first amplitude in the first amplitude set is used when the transmit end performs precoding processing. It may be understood that when the first parameter includes the first amplitude set, the receive end may determine information such as an SNR based on the first amplitude set, to facilitate phase noise processing.

For example, the transmit end adds the first parameter to the first information and transmits the first information to the receive end.

In another example, the transmit end adds an index of the first parameter to the first information and transmits the first information to the receive end.

A correspondence between the first parameter and the index of the first parameter may be pre-specified in a communication protocol, or may be pre-agreed by the transmit end and the receive end. This is not limited.

For example, referring to the following Table 2. An index 1 may correspond to a first phase set $\{0,\pi\}$. An index 2 may correspond to a first phase set $\{0,\pi/2,\pi,3\pi/2\}$. An index 3 may correspond to a first phase set $\{0,\pi/4,2\pi/4,3\pi/4,\pi,5\pi/4,6\pi/4,7\pi/4\}$. An index 4 may correspond to a first phase set $\{0,\pi/8,2\pi/8,3\pi/8,4\pi/8,\ldots,15\pi/8\}$. An index 5 may correspond to a first phase set $\{0,\pi/16,2\pi/16,3\pi/16,4\pi/16,\ldots,31\pi/16\}$.

TABLE 2

| Index | First phase set |
|---|---|
| 1 | $\{0, \pi\}$ |
| 2 | $\{0, \pi/2, \pi, 3\pi/2\}$ |
| 3 | $\{0, \pi/4, 2\pi/4, 3\pi/4, \pi, 5\pi/4, 6\pi/4, 7\pi/4\}$ |
| 4 | $\{0, \pi/8, 2\pi/8, 3\pi/8, 4\pi/8, \ldots, 15\pi/8\}$ |
| 5 | $\{0, \pi/16, 2\pi/16, 3\pi/16, 4\pi/16, \ldots, 31\pi/16\}$ |

For another example, refer to the following Table 3. An index 1 may correspond to a first amplitude set $\{0.5, 1.5\}$. An index 2 may correspond to a first amplitude set $\{0.5, 1.5, 2\}$.

TABLE 3

| Index | First amplitude set |
|---|---|
| 1 | $\{0.5, 1.5\}$ |
| 2 | $\{0.5, 1.5, 2\}$ |

For another example, refer to the following Table 4. An index 1 may correspond to a first phase set $\{0,\pi\}$ and a first amplitude set $\{0.5,1.5\}$. An index 2 may correspond to a first phase set $\{0,\pi/2,\pi,3\pi/2\}$ and a first amplitude set $\{0.5, 1.5\}$. An index 3 may correspond to a first phase set $\{0,\pi/2,\pi,3\pi/2\}$ and a first amplitude set $\{0.5, 1.5, 2\}$.

TABLE 4

| Index | First phase set | First amplitude set |
|---|---|---|
| 1 | $\{0, \pi\}$ | $\{0.5, 1.5\}$ |
| 2 | $\{0, \pi/2, \pi, 3\pi/2\}$ | $\{0.5, 1.5\}$ |
| 3 | $\{0, \pi/2, \pi, 3\pi/2\}$ | $\{0.5, 1.5, 2\}$ |

Optionally, the first information further indicates a second parameter.

The second parameter includes one or more of the following: a non-linear interference threshold, a phase noise level, and an amplitude/power adjustment threshold.

For the non-linear interference threshold, a value of a non-linear interference value is related to performance of the communication system. For example, from a perspective of a transmit end, if a communication system can withstand a large amount of non-linear interference, performance of the communication system is better. However, it also means that a quantity of adjustment values that can be selected by the communication system is limited, and some receive ends with limited capabilities may not be guaranteed to have a same processing capability as the transmit end. That is, from a perspective of the transmit end, it may be expected to be able to process greater non-linear interference, but from a perspective of the receive end, a capability of the receive end restricts the receive end, and the receive end cannot bear greater non-linear interference. Therefore, the performance of the communication system can be improved by properly setting the non-linear interference threshold.

A phase noise level also affects a freedom degree of the quantity of adjustment values that can be selected by the communication system. If the phase noise level is low, the receive end may not be able to separate the first phase from the phase noise. The performance of the communication system can be improved by reasonably setting the phase noise level and determining the freedom degree of the quantity of adjustment values.

For example, the transmit end adds the second parameter to the first information and transmits the first information to the receive end.

In another example, the transmit end adds an index of the second parameter to the first information and transmits the first information to the receive end.

A correspondence between the second parameter and the index of the second parameter may be pre-specified in a communication protocol, or may be pre-agreed by the transmit end and the receive end. This is not limited.

For example, refer to the following Table 5. An index 1 may correspond to a first phase set $\{0, \pi\}$, a first amplitude set $\{0.5, 1.5\}$, a non-linear interference threshold, a phase noise level, and an amplitude/power adjustment threshold. An index 2 may correspond to a first phase set $\{0,\pi/2,\pi,3\pi/2\}$, a first amplitude set $\{0.5,1.5\}$, a non-linear interference threshold, a phase noise level, and an amplitude/power adjustment threshold. An index 3 may correspond to a first phase set $\{0,\pi/2,\pi,3\pi/2\}$, a first amplitude set $\{0.5, 1.5, 2\}$, a non-linear interference threshold, a phase noise level, and an amplitude/power adjustment threshold.

TABLE 5

| Index | First phase set | First amplitude set | Non-linear interference threshold | Phase noise level | Amplitude/Power adjustment threshold |
|---|---|---|---|---|---|
| 1 | $\{0, \pi\}$ | $\{0.5, 1.5\}$ | >2 | $\{-30\ 30\}$ | 2 |
| 2 | $\{0, \pi/2, \pi, 3\pi/2\}$ | $\{0.5, 1.5\}$ | >2 | $\{-20\ 20\}$ | 2 |
| 3 | $\{0, \pi/2, \pi, 3\pi/2\}$ | $\{0.5, 1.5, 2\}$ | 1-2 | $\{-30\ 30\}$ | 2 |

Optionally, the transmit end adds the first information to DCI signaling, MAC-CE signaling, or RRC signaling, and transmits the DCI signaling, MAC-CE signaling, or RRC signaling to the receive end. This is not limited.

Step 402: The transmit end generates the first signal.

The transmit end may perform non-linear precoding on the first PTRS based on the first parameter and the interference information of the first PTRS, to obtain the first signal. The amplitude of the first signal meets the first threshold.

Figure 7:
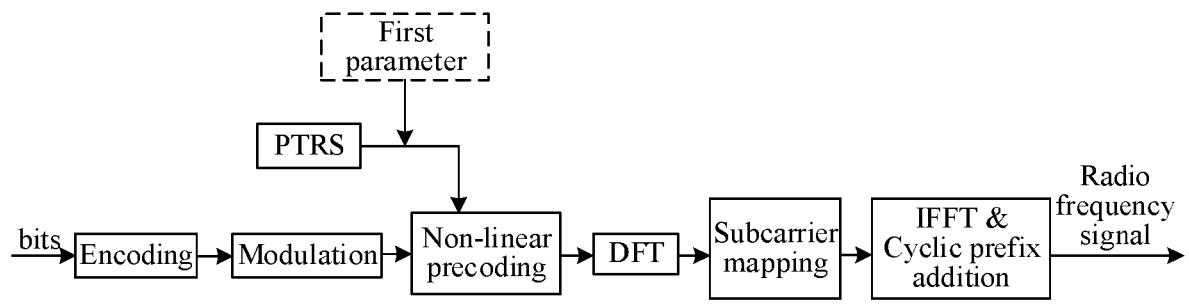
FIG. 7 is a schematic diagram of a non-linear precoding model according to an embodiment of this application.

For example, the transmit end may process the first PTRS by using a non-linear precoding model shown in FIG. 7 and the first parameter, and sequentially perform processing such as non-linear precoding, DFT, subcarrier mapping, IFFT, and cyclic prefix addition on the processed first PTRS, to obtain the first signal.

Figure 8:
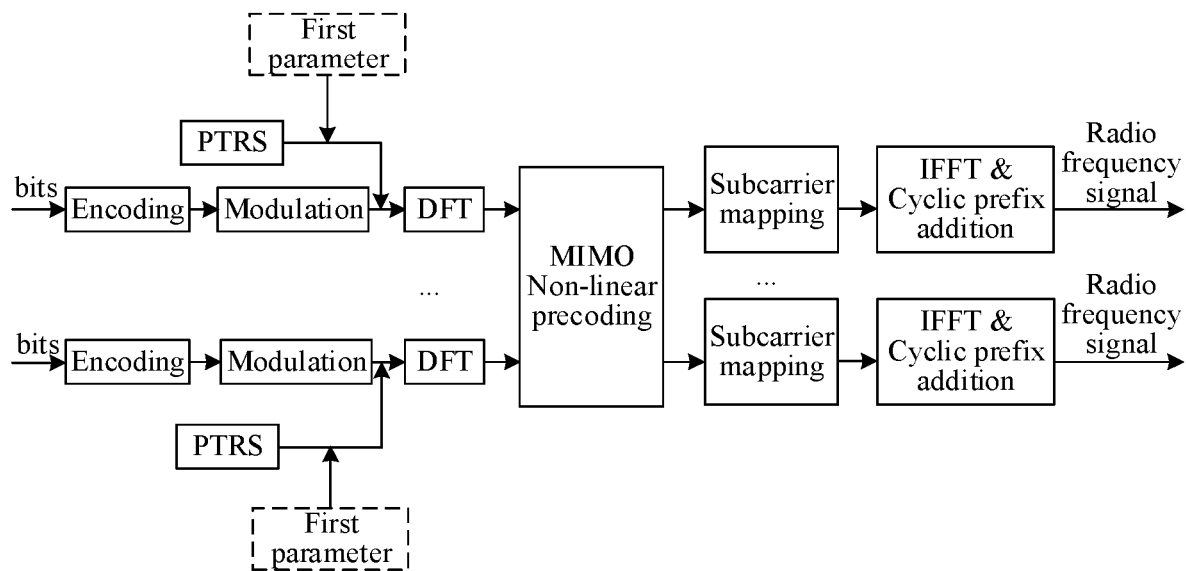
FIG. 8 is a schematic diagram of a MIMO non-linear precoding model according to an embodiment of this application.

In another example, the transmit end may separately process each first PTRS by using a MIMO non-linear precoding model shown in FIG. 8 and the first parameter, and sequentially perform processing such as non-linear precoding, DFT, subcarrier mapping, IFFT, and cyclic prefix addition on the processed first PTRS, to obtain a first signal corresponding to each first PTRS.

Step 403: The transmit end transmits the first signal. Correspondingly, the receive end receives the first signal.

The transmit end may transmit the first signal to the receive end after performing a single-carrier time domain shaping operation or a frequency domain shaping operation on the first signal.

Step 404: The receive end determines, based on the first information and the first signal, an estimated value of the phase noise corresponding to the first PTRS.

After receiving the first information and the first signal, the receive end may determine, based on the first information, the first parameter used by the transmit end, perform blind detection on the first PTRS based on the first parameter, and estimate the estimated value of the phase noise corresponding to the first PTRS.

Specifically, for determining the estimated value of the phase noise by the receive end, refer to the description of the estimated value of the phase noise in step 401. Details are not described again.

Further, the receive end may further perform phase noise compensation based on the estimated value of the phase noise, to improve the performance of the communication system.

Based on the method shown in FIG. 4, the receive end may determine, based on the first information, the first parameter introduced when the transmit end performs a non-linear operation on the first PTRS, properly determine, based on the first parameter and the received first signal, the estimated value of the phase noise corresponding to the first PTRS, and then perform phase compensation based on the estimated value of the phase noise. This improves communication performance of a communication system.

Figure 9:
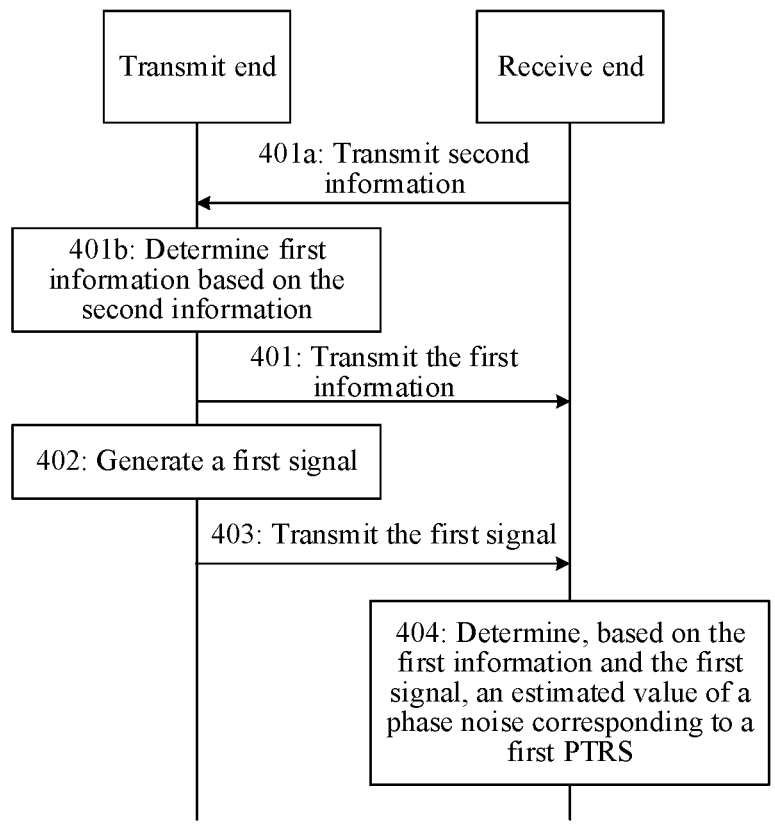
FIG. 9 is a flowchart of a phase noise estimation method according to an embodiment of this application.

Based on the method shown in FIG. 4, as shown in FIG. 9, before step 401 is performed, the following step 401a and step 401b may be further performed.

Step 401a: The receive end transmits second information. Correspondingly, the transmit end receives the second information.

The second information indicates a phase noise capability of the receive end.

Specifically, the phase noise capability of the receive end may include one or more of the following: a phase noise level of the receive end, a maximum distortion degree corresponding to non-linear precoding of the receive end, and a maximum value of a PTRS phase offset degree processed by the receive end.

Optionally, the receive end adds the second information to DCI signaling, MAC-CE signaling, or RRC signaling, and transmits the DCI signaling, MAC-CE signaling, or RRC signaling to the transmit end. This is not limited.

Step 401b: The transmit end determines the first information based on the second information.

The transmit end may properly determine the first information based on the phase noise capability of the receive end, so that the receive end properly determines the estimated value of the phase noise based on the first information and the subsequently received first signal within a phase noise capability range of the receive end.

Further, based on the method shown in FIG. 4 and/or FIG. 9, after receiving the first information, the receive end may further determine, based on the first information, whether the first information is adapted to the phase noise capability of the receive end, and send third information that indicates whether the first information is adapted to the phase noise capability of the receive end to the transmit end. When the transmit end receives the third information, if the third information indicates that the first information is not adapted to the phase noise capability of the receive end, the transmit end may re-determine the first information, so that the re-determined first information is adapted to the phase noise capability of the receive end. Therefore, it is convenient for the receive end to properly determine, within the phase noise capability range of the receive end, the estimated value of the phase noise based on the first information and the subsequently received first signal, thereby improving the performance of the communication system.

The solutions provided in embodiments of this application are mainly described above from a perspective of interaction between the devices. It may be understood that, to implement the foregoing functions, each device includes a corresponding hardware structure and/or a corresponding software module for performing each function. A person skilled in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, each device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in this embodiment of this application is an example, and is only logical function division. During actual implementation, there may be another feasible division manner.

Figure 10:
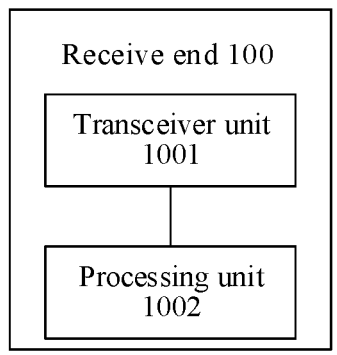
FIG. 10 is a schematic diagram of composition of a receive end according to an embodiment of this application.

When each function module is obtained through division corresponding to each function, FIG. 10 shows a receive end. The receive end 100 may include a transceiver unit 1001 and a processing unit 1002. For example, the receive end 100 may be a receive end, or may be a chip applied to the receive end, or another combined component, component, or the like, that has the foregoing receive end function. When the receive end 100 is a receive end, the transceiver unit 1001 may be a transceiver, and the transceiver may include an antenna, a radio frequency circuit, and the like. The processing unit 1002 may be a processor (or a processing circuit), for example, a baseband processor. The baseband processor may include one or more CPUs. When the receive end 100 is a component having the foregoing receive end function, the transceiver unit 1001 may be a radio frequency unit. The processing unit 1002 may be a processor (or a processing circuit), for example, a baseband processor. When the receive end 100 is a chip system, the transceiver unit 1001 may be an input/output interface of a chip (for example, a baseband chip). The processing unit 1002 may be a processor (or a processing circuit) of a chip system, or a logic circuit, and may include one or more central processing units. It should be understood that the transceiver unit 1001 in this embodiment of this application may be implemented by a transceiver or a transceiver-related circuit component. The processing unit 1002 may be implemented by a processor or a processor-related circuit component (or referred to as a processing circuit).

For example, the transceiver unit 1001 may be configured to perform all transceiver operations performed by the receive end in the embodiments shown in FIG. 4 to FIG. 9, and/or configured to support another process of the technology described in this specification. The processing unit 1002 may be configured to perform all operations performed by the receive end in the embodiments shown in FIG. 4 to FIG. 9, except the transceiver operations, and/or configured to support another process of the technology described in this specification.

The transceiver unit 1001 is configured to obtain first information and a first signal.

The processing unit 1002 is configured to determine, based on the first information and the first signal, an estimated value of a phase noise corresponding to a first PTRS. The first information indicates a first parameter corresponding to interference information of the first PTRS. The first parameter includes one or more of the following: a first phase set, and a first amplitude set. The first signal is determined based on the first parameter and the interference information of the first PTRS. An amplitude of the first signal meets a first threshold.

In a possible design, the first information includes an index of the first parameter; or the first information includes an index of the first parameter.

In a possible design, the first information further indicates a second parameter. The second parameter includes one or more of the following: a non-linear interference threshold, a phase noise level, and an amplitude/power adjustment threshold.

In a possible design, the first information includes the second parameter; or the first information includes an index of the second parameter.

In a possible design, before obtaining the first information, the transceiver unit 1001 further transmits second information that indicates a phase noise capability of the receive end.

In a possible design, the phase noise capability of the receive end includes one or more of the following: a phase noise level of the receive end, a maximum distortion degree corresponding to non-linear precoding of the receive end, and a maximum value of a PTRS phase offset degree processed by the receive end.

In a possible design, after obtaining the first information, the transceiver unit 1001 further transmits third information that indicates whether the first information is adapted to the phase noise capability of the receive end.

In another possible implementation, the transceiver unit 1001 in FIG. 10 may be replaced by a transceiver, and the transceiver may integrate a function of the transceiver unit 1001. The processing unit 1002 may be replaced by a processor, and the processor may integrate a function of the processing unit 1002. Further, the receive end 100 shown in FIG. 10 may further include a memory. When the transceiver unit 1001 is replaced by a transceiver, and the processing unit 1002 is replaced by a processor, the receive end 100 in this embodiment of this application may be the communication apparatus shown in FIG. 2.

Figure 12:
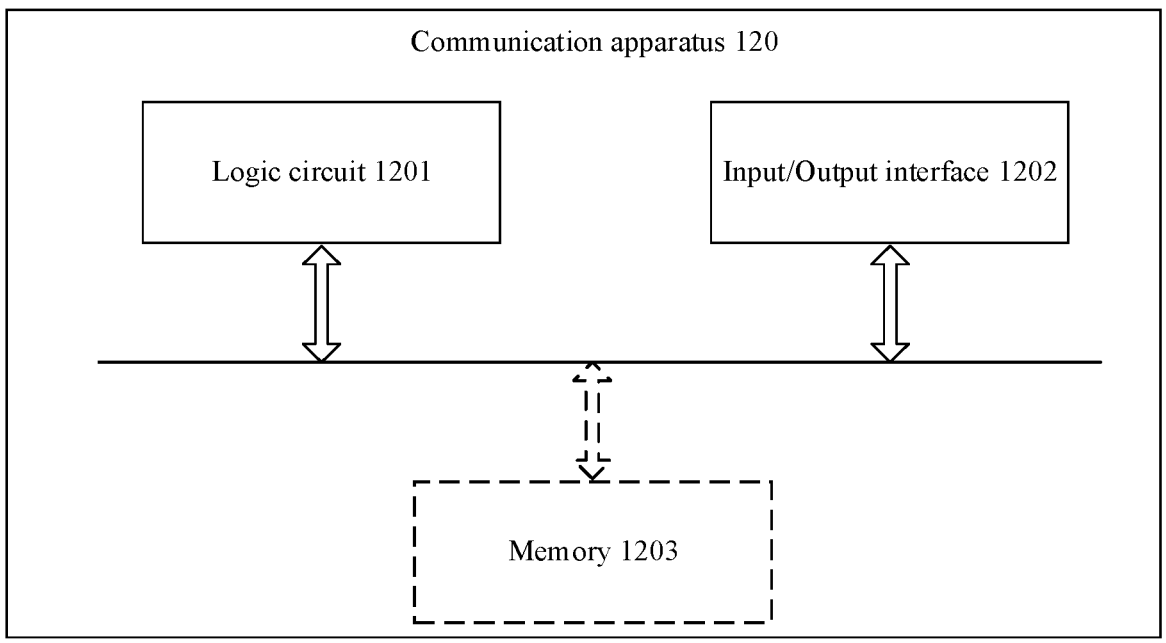
FIG. 12 is a schematic diagram of composition of a communication apparatus according to an embodiment of this application.

Alternatively, when the transceiver unit 1001 is replaced by a transceiver, and the processing unit 1002 is replaced by a processor, the receive end 100 in this embodiment of this application may further be a communication apparatus 120 shown in FIG. 12. The processor may be a logic circuit 1201. The transceiver may be an input/output interface 1202. Further, the communication apparatus 120 shown in FIG. 12 may further include a memory 1203.

Figure 11:
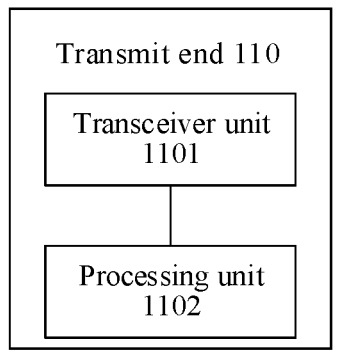
FIG. 11 is a schematic diagram of composition of a transmit end according to an embodiment of this application.

When each function module is obtained through division corresponding to each function, FIG. 11 shows a transmit end. The transmit end no may include a transceiver unit 1101 and a processing unit 1102. For example, the transmit end no may be a transmit end, or may be a chip applied to the transmit end, or another combined component, component, or the like, that has the foregoing transmit end function. When the transmit end no is a transmit end, the transceiver unit 1101 may be a transceiver, and the transceiver may include an antenna, a radio frequency circuit, and the like. The processing unit 1102 may be a processor (or a processing circuit), for example, a baseband processor. The baseband processor may include one or more CPUs. When the transmit end no is a component having the foregoing transmit end function, the transceiver unit 1101 may be a radio frequency unit. The processing unit 1102 may be a processor (or a processing circuit), for example, a baseband processor. When the transmit end 110 is a chip system, the transceiver unit 1101 may be an input/output interface of a chip (for example, a baseband chip). The processing unit 1102 may be a processor (or a processing circuit) of a chip system, or a logic circuit, and may include one or more central processing units. It should be understood that the transceiver unit 1101 in this embodiment of this application may be implemented by a transceiver or a transceiver-related circuit component. The processing unit 1102 may be implemented by a processor or a processor-related circuit component (or referred to as a processing circuit).

For example, the transceiver unit 1101 may be configured to perform all transceiver operations performed by the transmit end in the embodiments shown in FIG. 4 to FIG. 9, and/or configured to support another process of the technology described in this specification. The processing unit 1102 may be configured to perform all operations performed by the transmit end in the embodiments shown in FIG. 4 to FIG. 9, except the transceiver operations, and/or configured to support another process of the technology described in this specification.

The transceiver unit 1101 is configured to transmit first information that indicates a first parameter corresponding to interference information of a first PTRS. The first parameter includes one or more of the following: a first phase set, and a first amplitude set. The processing unit 1102 is configured to perform non-linear precoding on the first PTRS based on the first parameter and the interference information of the first PTRS, to obtain a first signal, and the transceiver unit 1101 is further configured to transmit the first signal. An amplitude of the first signal meets a first threshold.

In a possible design, the first information includes an index of the first parameter; or the first information includes an index of the first parameter.

In a possible design, the first information further indicates a second parameter. The second parameter includes one or more of the following: a non-linear interference threshold, a phase noise level, and an amplitude/power adjustment threshold.

In a possible design, the first information includes the second parameter; or the first information includes an index of the second parameter.

In a possible design, before transmitting the first signal, the transceiver unit 1101 further obtains second information that indicates a phase noise capability of the receive end. The transmit end determines the first information based on the phase noise capability of the receive end.

In a possible design, the phase noise capability of the receive end includes one or more of the following: a phase noise level of the receive end, a maximum distortion degree corresponding to non-linear precoding of the receive end, and a maximum value of a PTRS phase offset degree processed by the receive end.

In a possible design, after transmitting the first information, the transceiver unit 1101 further obtains third information that indicates whether the first information is adapted to the phase noise capability of the receive end.

In another possible implementation, the transceiver unit 1101 in FIG. 11 may be replaced by a transceiver, and the transceiver may integrate a function of the transceiver unit 1101. The processing unit 1102 may be replaced by a processor, and the processor may integrate a function of the processing unit 1102. Further, the transmit end 110 shown in FIG. 11 may further include a memory. When the transceiver unit 1101 is replaced by a transceiver, and the processing unit 1102 is replaced by a processor, the transmit end no in this embodiment of this application may be the communication apparatus shown in FIG. 2.

Alternatively, when the transceiver unit 1101 is replaced by a transceiver, and the processing unit 1102 is replaced by a processor, the transmit end no in this embodiment of this application may further be the communication apparatus 120 shown in FIG. 12. The processor may be the logic circuit 1201. The transceiver may be the input/output interface 1202. Further, the communication apparatus 120 shown in FIG. 12 may further include a memory 1203.

An embodiment of this application further provides a computer-readable storage medium. All or some of the procedures in the foregoing method embodiments may be completed by a computer program instructing relevant hardware. The program may be stored in the foregoing computer-readable storage medium. When the program is executed, the procedures in the foregoing method embodiments may be included. The computer-readable storage medium may be an internal storage unit, for example, a hard disk or memory of a terminal, of the terminal in any one of the foregoing embodiments (including a data transmit end and/or a data receive end). Alternatively, the computer-readable storage medium may be an external storage device of the terminal, for example, a plug-in hard disk, a smart media card (SMC), a secure digital (SD) card, or a flash card that is provided on the terminal. Further, the computer-readable storage medium may alternatively include both the internal storage unit and the external storage device that are of the foregoing terminal. The computer-readable storage medium is configured to store the computer program and another program and data required by the terminal. The computer-readable storage medium may be further configured to temporarily store data that has been output or is to be output.

Embodiments of the present invention are summarized here. Other embodiments can also be understood from the entirety of the specification and the claims filed herein.

Example 1. A phase noise estimation method, including: obtaining, by a receive end, first information, wherein the first information indicates a first parameter corresponding to interference information of a first phase tracking reference signal PTRS; and the first parameter comprises one or more of the following: a first phase set, and a first amplitude set; obtaining, by the receive end, a first signal, wherein the first signal is determined based on the first parameter and the interference information of the first PTRS; and an amplitude of the first signal meets a first threshold; and determining, by the receive end based on the first information and the first signal, an estimated value of a phase noise corresponding to the first PTRS.

Example 2. The method according to example 2, where the first information comprises the first parameter; or the first information comprises an index of the first parameter.

Example 3. The method according to example 1 or 2, where the first information further indicates a second parameter; and the second parameter comprises one or more of the following: a non-linear interference threshold, a phase noise level, and an amplitude/power adjustment threshold.

Example 4. The method according to example 4, where: the first information comprises the second parameter; or the first information comprises an index of the second parameter.

Example 5. The method according to any one of examples 1 to 4, where before the obtaining, by the receive end, the first information, the method further comprises: transmitting, by the receive end, second information, wherein the second information indicates a phase noise capability of the receive end.

Example 6. The method according to example 5, where the phase noise capability of the receive end includes one or more of the following: a phase noise level of the receive end, a maximum distortion degree corresponding to non-linear precoding of the receive end, and a maximum value of a PTRS phase offset degree processed by the receive end.

Example 7. The method according to any one of examples 1 to 6, where after the obtaining, by the receive end, the first information, the method further includes: transmitting, by the receive end, third information, wherein the third information indicates whether the first information is adapted to the phase noise capability of the receive end.

Example 8. A phase noise estimation method, including: transmitting, by a transmit end, first information, wherein the first information indicates a first parameter corresponding to interference information of a first phase tracking reference signal PTRS; and the first parameter comprises one or more of the following: a first phase set, and a first amplitude set; performing, by the transmit end, non-linear precoding on the first PTRS based on the first parameter and the interference information of the first PTRS, to obtain a first signal, wherein an amplitude of the first signal meets a first threshold; and transmitting, by the transmit end, the first signal.

Example 9. The method according to example 8, where: the first information comprises the first parameter; or the first information comprises an index of the first parameter.

Example 10. The method according to example 8 or 9, where the first information further indicates a second parameter; and the second parameter comprises one or more of the following: a non-linear interference threshold, a phase noise level, and an amplitude/power adjustment threshold.

Example 11. The method according to example 10, where the first information includes the second parameter; or the first information includes an index of the second parameter.

Example 12. The method according to any one of examples 8 to 11, where before the transmitting, by the transmit end, the first signal, the method further includes: obtaining, by the transmit end, second information, wherein the second information indicates a phase noise capability of a receive end; and determining, by the transmit end, the first information based on the phase noise capability of the receive end.

Example 13. The method according to claim 12, where the phase noise capability of the receive end comprises one or more of the following: a phase noise level of the receive end, a maximum distortion degree corresponding to non-linear precoding of the receive end, and a maximum value of a PTRS phase offset degree processed by the receive end.

Example 14. The method according to any one of examples 8 to 13, where after the transmitting, by the transmit end, the first information, the method further comprises: obtaining, by the transmit end, third information, wherein the third information indicates whether the first information is adapted to the phase noise capability of the receive end.

Example 15. A receive end, including: a transceiver unit, configured to obtain first information, wherein the first information indicates a first parameter corresponding to interference information of a first phase tracking reference signal PTRS; and the first parameter comprises one or more of the following: a first phase set, and a first amplitude set; the transceiver unit is further configured to obtain a first signal, wherein the first signal is determined based on the first parameter and the interference information of the first PTRS; and an amplitude of the first signal meets a first threshold; and a processing unit, configured to determine, based on the first information and the first signal, an estimated value of a phase noise corresponding to the first PTRS.

Example 16. The receive end according to example 15, where the first information includes the first parameter; or the first information includes an index of the first parameter.

Example 17. The receive end according to example 15 or 16, where the first information further indicates a second parameter; and the second parameter comprises one or more of the following: a non-linear interference threshold, a phase noise level, and an amplitude/power adjustment threshold.

Example 18. The receive end according to claim 17, where the first information comprises the second parameter; or the first information comprises an index of the second parameter.

Example 19. The receive end according to any one of examples 15 to 18, where before obtaining the first information, the transceiver unit is further configured to transmit second information, wherein the second information indicates a phase noise capability of the receive end.

Example 20. The receive end according to example 19, where the phase noise capability of the receive end comprises one or more of the following: a phase noise level of the receive end, a maximum distortion degree corresponding to non-linear precoding of the receive end, and a maximum value of a PTRS phase offset degree processed by the receive end.

Example 21. The receive end according to any one of examples 15 to 20, where after obtaining the first information, the transceiver unit is further configured to transmit third information, wherein the third information indicates whether the first information is adapted to the phase noise capability of the receive end.

Example 22. A transmit end, including: a transceiver unit, configured to transmit first information, wherein the first information indicates a first parameter corresponding to interference information of a first phase tracking reference signal PTRS; and the first parameter comprises one or more of the following: a first phase set, and a first amplitude set; and a processing unit, configured to perform non-linear precoding on the first PTRS based on the first parameter and the interference information of the first PTRS, to obtain a first signal; wherein an amplitude of the first signal meets a first threshold; and the transceiver unit is further configured to transmit the first signal.

Example 23. The transmit end according to example 22, where the first information further indicates a second parameter; and the second parameter comprises one or more of the following: a non-linear interference threshold, a phase noise level, and an amplitude/power adjustment threshold.

Example 24. The transmit end according to example 22 or 23, where before transmitting the first signal, the transceiver unit is further configured to obtain second information, wherein the second information indicates a phase noise capability of a receive end; and the processing unit is further configured to determine the first information based on the phase noise capability of the receive end.

Example 25. The transmit end according to any one of examples 22 to 24, where after transmitting the first information, the transceiver unit is further configured to obtain third information, wherein the third information indicates whether the first information is adapted to the phase noise capability of the receive end.

Example 26. A communication apparatus, where the communication apparatus includes a processor; and the processor is configured to run a computer program or instructions, so that the communication apparatus performs the phase noise estimation method according to any one of examples 1 to 7, or performs the phase noise estimation method according to any one of examples 8 to 14.

Example 27. A communication apparatus, wherein the communication apparatus comprises a processor and a memory; and the memory is coupled to the processor, the memory is configured to store a computer program or instructions, and the processor is configured to run the computer program or the instructions, to perform the phase noise estimation method according to any one of examples 1 to 7, or perform the phase noise estimation method according to any one of examples 8 to 14.

Example 28. A communication apparatus, wherein the communication apparatus comprises an input/output interface and a logic circuit; the input/output interface is configured to obtain input information and/or output information; and the logic circuit is configured to: perform the phase noise estimation method according to any one of examples 1 to 7, or perform the phase noise estimation method according to any one of examples 8 to 14, and perform processing based on the input information and/or generate the output information, where the input information and/or the output information comprises first information and a first signal; the first information indicates a first parameter corresponding to interference information of a first phase tracking reference signal PTRS; the first parameter comprises one or more of the following: a first phase set, and a first amplitude set; the first signal is determined based on the first parameter and the interference information of the first PTRS; and an amplitude of the first signal meets a first threshold.

Example 29. A computer-readable storage medium, where the computer-readable storage medium stores computer instructions or a program, and when the computer instructions are run or the program is run on a computer, the computer is enabled to: perform the phase noise estimation method according to any one of examples 1 to 7, or perform the phase noise estimation method according to any one of examples 8 to 14.

Example 30. A computer program product, wherein the computer program product comprises computer instructions; and when some or all of the computer instructions are run on a computer, the computer is enabled to: perform the phase noise estimation method according to any one of examples 1 to 7, or perform the phase noise estimation method according to any one of examples 8 to 14.

Example 31. A communication system, comprising a transmit end and a receive end, where the transmit end is configured to transmit first information, wherein the first information indicates a first parameter corresponding to interference information of a first phase tracking reference signal PTRS; and the first parameter comprises one or more of the following: a first phase set, and a first amplitude set; the transmit end is further configured to: perform non-linear precoding on the first PTRS based on the first parameter and the interference information of the first PTRS, to obtain a first signal, and transmit the first signal, wherein an amplitude of the first signal meets a first threshold; and the receive end is configured to obtain the first information, and is further configured to: obtain the first signal; and determine, based on the first information and the first signal, an estimated value of a phase noise corresponding to the first PTRS.

It should be noted that, the terms "first", "second", and the like in the specification, claims, and accompanying drawings of this application are intended to distinguish between different objects, but are not intended to describe a specific order. In addition, terms such as "including" and "having" and any other variants thereof are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device.

It should be understood that in this application, "at least one (item)" refers to one or more, "multiple" refers to two or more, "at least two (items)" refers to two or three or more, and "and/or" is used to describe an association relationship of associated objects, and indicates that three relationships may exist. For example, "A and/or B" may indicate: Only A exists, only B exists, and both A and B exist. A and B may be singular or plural. The character "/" generally indicates that the associated objects are in an "OR" relationship. "At least one of the following" or a similar expression thereof indicates any combination of the following, including any combination of one or more of the following. For example, at least one of a, b, or c may represent: a, b, c, "a and b", "a and c", "b and c", or "a and b and c", where a, b, and c may be one or more.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and there may be another division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to a conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of claims.

What is claimed is:

1. A phase noise estimation method, comprising:
   obtaining, by a receive end, first information indicating a first parameter corresponding to interference information of a first phase tracking reference signal (PTRS), wherein the first parameter comprises one or more of a first phase set or a first amplitude set;
   obtaining, by the receive end, a first signal, wherein the first signal is determined based on the first parameter and the interference information of the first PTRS, wherein an amplitude of the first signal meets a first threshold; and determining, by the receive end based on the first information and the first signal, an estimated value of a phase noise corresponding to the first PTRS.

2. The method according to claim 1, wherein:
the first information comprises the first parameter; or
the first information comprises an index of the first parameter.

3. The method according to claim 1, wherein:
the first information further indicates a second parameter; and
the second parameter comprises one or more of a non-linear interference threshold, a phase noise level, or an amplitude/power adjustment threshold.

4. The method according to claim 3, wherein:
the first information comprises the second parameter; or
the first information comprises an index of the second parameter.

5. The method according to claim 1, wherein the method further comprises:
before obtaining the first information, transmitting, by the receive end, second information, wherein the second information indicates a phase noise capability of the receive end.

6. The method according to claim 5, wherein
the phase noise capability of the receive end comprises one or more of the following:
a phase noise level of the receive end,
a maximum distortion degree corresponding to non-linear precoding of the receive end, or
a maximum value of a PTRS phase offset degree processed by the receive end.

7. The method according to claim 1, wherein the method further comprises:
after obtaining the first information, transmitting, by the receive end, third information, wherein the third information indicates whether the first information is adapted to a phase noise capability of the receive end.

8. A phase noise estimation method, comprising:
transmitting, by a transmit end, first information, wherein the first information indicates a first parameter corresponding to interference information of a first phase tracking reference signal (PTRS), and the first parameter comprises one or more of a first phase set, or a first amplitude set;
performing, by the transmit end, non-linear precoding on the first PTRS based on the first parameter and the interference information of the first PTRS, to obtain a first signal, wherein an amplitude of the first signal meets a first threshold; and
transmitting, by the transmit end, the first signal.

9. The method according to claim 8, wherein:
the first information comprises the first parameter; or
the first information comprises an index of the first parameter.

10. The method according to claim 8, wherein:
the first information further indicates a second parameter; and
the second parameter comprises one or more of the following: a non-linear interference threshold, a phase noise level, or an amplitude/power adjustment threshold.

11. The method according to claim 10, wherein:
the first information comprises the second parameter; or
the first information comprises an index of the second parameter.

12. The method according to claim 8, wherein the method further comprises:
before transmitting the first signal:
obtaining, by the transmit end, second information, wherein the second information indicates a phase noise capability of a receive end, and
determining, by the transmit end, the first information based on the phase noise capability of the receive end.

13. The method according to claim 12, wherein
the phase noise capability of the receive end comprises one or more of the following:
a phase noise level of the receive end;
a maximum distortion degree corresponding to non-linear precoding of the receive end; or
a maximum value of a PTRS phase offset degree processed by the receive end.

14. The method according to claim 12, wherein the method further comprises:
after transmitting the first information, obtaining, by the transmit end, third information, wherein the third information indicates whether the first information is adapted to the phase noise capability of the receive end.

15. A receive end, comprising:
a transceiver configured to obtain first information, wherein the first information indicates a first parameter corresponding to interference information of a first phase tracking reference signal (PTRS), and the first parameter comprises one or more of a first phase set, or a first amplitude set;
the transceiver is further configured to obtain a first signal, wherein the first signal is determined based on the first parameter and the interference information of the first PTRS, and an amplitude of the first signal meets a first threshold; and
a processor configured to determine, based on the first information and the first signal, an estimated value of a phase noise corresponding to the first PTRS.

16. The receive end according to claim 15, wherein:
the first information comprises the first parameter; or
the first information comprises an index of the first parameter.

17. The receive end according to claim 15, wherein:
the first information further indicates a second parameter; and
the second parameter comprises one or more of the following: a non-linear interference threshold, a phase noise level, or an amplitude/power adjustment threshold.

18. The receive end according to claim 17, wherein:
the first information comprises the second parameter; or
the first information comprises an index of the second parameter.

19. The receive end according to claim 15, wherein the transceiver is further configured to transmit second information before obtaining the first information, wherein the second information indicates a phase noise capability of the receive end.

20. The receive end according to claim 19, wherein the phase noise capability of the receive end comprises one or more of the following:
a phase noise level of the receive end;
a maximum distortion degree corresponding to non-linear precoding of the receive end; and
a maximum value of a PTRS phase offset degree processed by the receive end.

* * * * *